(12) United States Patent
Sugano

(10) Patent No.: US 11,653,023 B2
(45) Date of Patent: May 16, 2023

(54) ENCODING DEVICE, ENCODING METHOD, DECODING DEVICE, AND DECODING METHOD

(71) Applicant: SONY CORPORATION, Tokyo (JP)

(72) Inventor: Hisako Sugano, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 84 days.

(21) Appl. No.: 16/766,520

(22) PCT Filed: Nov. 16, 2018

(86) PCT No.: PCT/JP2018/042426
§ 371 (c)(1),
(2) Date: May 22, 2020

(87) PCT Pub. No.: WO2019/107180
PCT Pub. Date: Jun. 6, 2019

(65) Prior Publication Data
US 2021/0368206 A1 Nov. 25, 2021

(30) Foreign Application Priority Data

Dec. 1, 2017 (JP) .............................. JP2017-231794

(51) Int. Cl.
*H04N 19/597* (2014.01)
*G06T 7/55* (2017.01)
(Continued)

(52) U.S. Cl.
CPC ........... *H04N 19/597* (2014.11); *G06T 7/194* (2017.01); *G06T 7/55* (2017.01); *G06T 15/04* (2013.01); *G06T 15/20* (2013.01)

(58) Field of Classification Search
CPC ......... H04N 19/597; G06T 7/194; G06T 7/55; G06T 15/04; G06T 15/20
See application file for complete search history.

(56) References Cited

U.S. PATENT DOCUMENTS

2002/0164066 A1* 11/2002 Matsumoto ............. G06T 17/10
382/154
2015/0350579 A1* 12/2015 Shiozaki .............. H04N 5/3675
348/246
(Continued)

FOREIGN PATENT DOCUMENTS

JP H08161505 A 6/1996
JP 2008017386 A 1/2008
(Continued)

OTHER PUBLICATIONS

Hirosi Sankoh et al, "A Matting Method Based on Iterative Feedback from 3D Model of Objects to Each Camera View Point" Institute of Electronics, Information and Communication Engineers 2009,synthesis convention lecture collected papers, a separate volume: The information system 2, Japan, Mar. 4, 2009 85th page, ISSN: 1349-1369.
(Continued)

*Primary Examiner* — Tracy Y. Li
(74) *Attorney, Agent, or Firm* — Paratus Law Group, PLLC

(57) ABSTRACT

There is provided an encoding device, an encoding method, a decoding device, and a decoding method capable of generating a more accurate three-dimensional model. A three-dimensional model generating unit generates three-dimensional model information representing a three-dimensional model of a subject on the basis of a plurality of captured images and active depth information, and a conversion processing unit converts the three-dimensional model represented by the three-dimensional model information into a plurality of two-dimensional images by projecting the three-dimensional model from a plurality of directions, and generates depth information representing a depth from an arbitrary viewpoint to the three-dimensional model by using the plurality of two-dimensional images. Then, trans-
(Continued)

mit data including the plurality of two-dimensional images, the depth information, and the active depth information is transmitted to the decoding device. The present technology can be applied to, for example, a free viewpoint video transmission system.

17 Claims, 29 Drawing Sheets

(51) Int. Cl.
    *G06T 7/194*     (2017.01)
    *G06T 15/04*     (2011.01)
    *G06T 15/20*     (2011.01)

(56) References Cited

U.S. PATENT DOCUMENTS

| | | | |
|---|---|---|---|
| 2015/0381965 | A1 | 12/2015 | Atanassov |
| 2016/0350601 | A1 | 12/2016 | Grauer |
| 2017/0048507 | A1* | 2/2017 | Campbell ............ H04N 13/161 |
| 2018/0047208 | A1* | 2/2018 | Marin .................. H04N 13/243 |
| 2018/0048820 | A1* | 2/2018 | Hinkel ............... H04N 5/23254 |
| 2019/0156504 | A1* | 5/2019 | Jiang ........................ G06T 7/85 |
| 2020/0228836 | A1* | 7/2020 | Schwarz ................. G06T 15/04 |

FOREIGN PATENT DOCUMENTS

| | | |
|---|---|---|
| JP | 2012-208759 A | 10/2012 |
| JP | 2014096701 A | 5/2014 |
| JP | 2015114722 A | 6/2015 |
| JP | 2016218594 A | 12/2016 |
| WO | WO-2017094543 A1 | 6/2017 |
| WO | WO-2017098999 A1 | 6/2017 |
| WO | WO-2018123801 A1 | 7/2018 |
| WO | WO-2019082958 A1 | 5/2019 |

OTHER PUBLICATIONS

Hirosi Sankoh et al, "Enhancement of Robust Matting Method based on 3D Model Feedback with Consistencies of Silhouettes" Proceedings of Workshop of the Institute ImageInformation and Television Engineers, Japan, Sep. 24, 2009, vol. 33, No. 37, pp. 75-80, ISSN:1342-6893.

Hisatomi Kensuke et al, "Dynamic 3D Models Generated From Multiple Video",NHK R&D, Japan, Japan Broadcast Publishing, Nov. 15, 2009, No. 118, pp. 30-41, ISSN: 0914-7535.

Sung Soo Hwang, et al., "Visual Hull-based Prediction Framework for 3D Object Coding", Proceedings of 2012 Picture Coding Symposium (PCS 2012), IEEE, May 9, 2012, pp. 225-228, Electronic—ISBN: 978-1-4577-2049-9, <DOI:10.1109/PCS.2012.6213333>.

* cited by examiner

FIG. 8
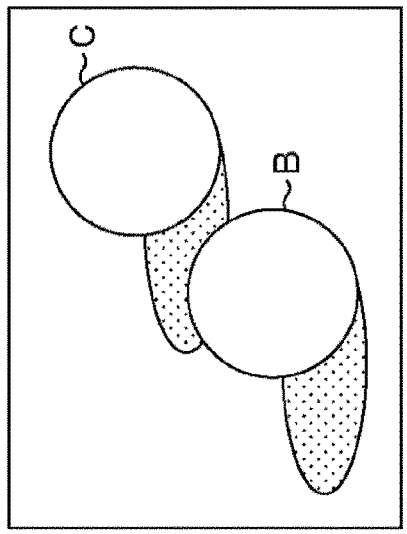
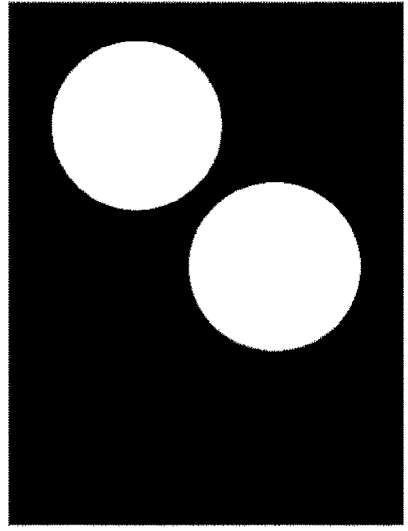
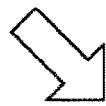
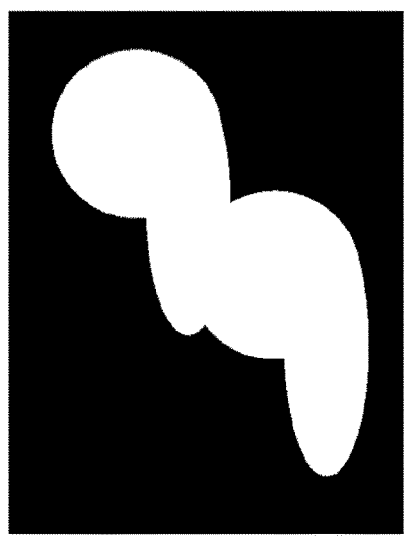

FIG. 16

| PIXEL POSITION INFORMATION | SUBSTANCE INFORMATION | COLOR INFORMATION | CORRECTION AMOUNT | RELIABILITY | RELIABILITY ALONG TIME AXIS |
|---|---|---|---|---|---|
| (x, y) = (100, 100) | SKIN | SKIN COLOR (252. 226. 196) | −2cm | MODERATE | YES |
| (x, y) = (100, 101) | SKIN | SKIN COLOR (252. 226. 196) | −2cm | MODERATE | YES |
| (x, y) = (100, 102) | SKIN | SKIN COLOR (252. 226. 196) | −2cm | MODERATE | YES |
| ... | ... | ... | ... | ... | ... |
| (x, y) = (200, 200) | HAIR | BLACK (0. 0. 0) | +4cm | LOW | NO |

FIG. 18

| SEGMENT INFORMATION | SUBSTANCE INFORMATION | COLOR INFORMATION | CORRECTION AMOUNT | RELIABILITY | RELIABILITY ALONG TIME AXIS |
|---|---|---|---|---|---|
| 1 | ANIMAL, HORSE | BROWN | −1cm | HIGH | YES |
| 2 | PERSON | WHITE (255, 255, 255) | −2cm | HIGH | YES |
| 3 | CAR | GRAY (128, 128, 128) | −3cm | HIGH | YES |
| ... | ... | ... | ... | ... | ... |
| 10 | GRASSLAND | GREEN (88, 191, 63) | +4cm | HIGH | NO |
| 11 | GRASSLAND | GREEN (88, 191, 63) | +15cm | HIGH | NO |

FIG. 20

| PIXEL POSITION INFORMATION | SUBSTANCE INFORMATION | COLOR INFORMATION | CORRECTION CURVE | RELIABILITY | RELIABILITY ALONG TIME AXIS |
|---|---|---|---|---|---|
| (x, y) = (100, 100) | SKIN | SKIN COLOR (252, 226, 196) | A | MODERATE | YES |
| (x, y) = (100, 101) | SKIN | SKIN COLOR (252, 226, 196) | A | MODERATE | YES |
| (x, y) = (100, 102) | SKIN | SKIN COLOR (252, 226, 196) | A | MODERATE | YES |
| ... | ... | ... | ... | ... | ... |
| (x, y) = (200, 200) | HAIR | BLACK (0, 0, 0) | C | LOW | NO |

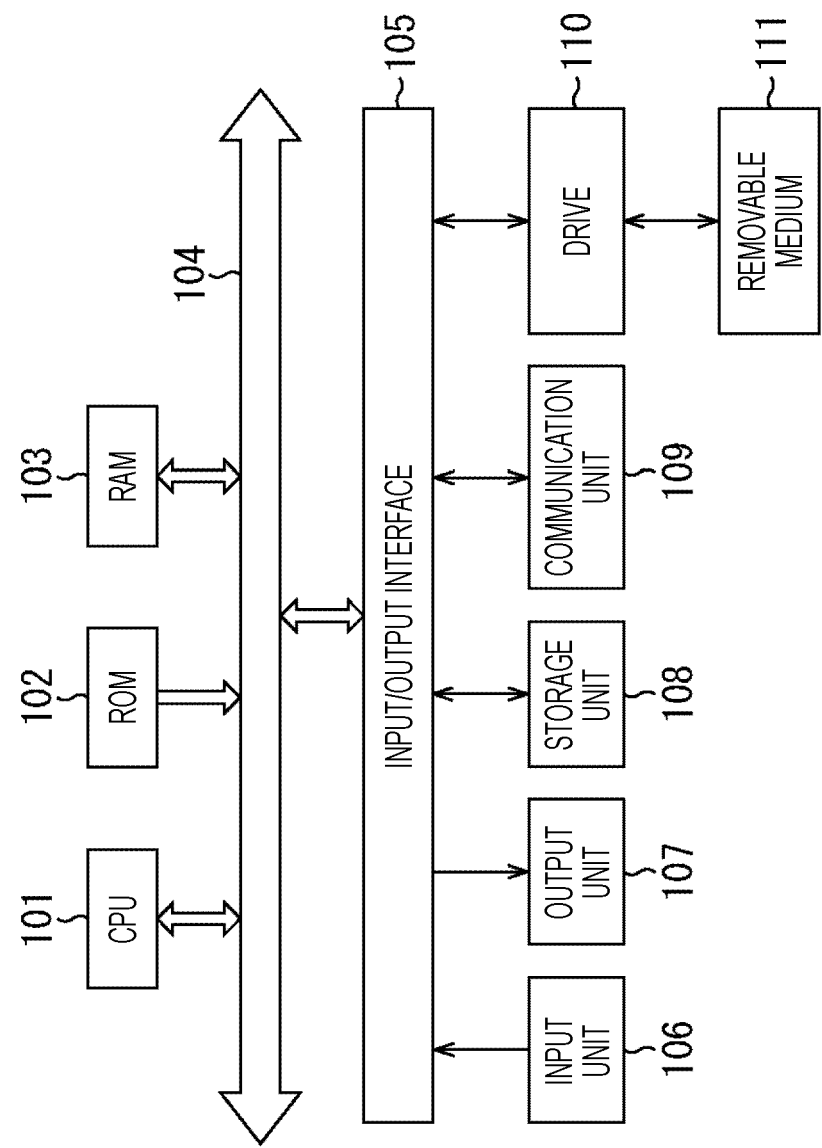

ENCODING DEVICE, ENCODING METHOD, DECODING DEVICE, AND DECODING METHOD

CROSS REFERENCE TO PRIOR APPLICATION

This application is a National Stage Patent Application of PCT International Patent Application No. PCT/JP2018/042426 (filed on Nov. 16, 2018) under 35 U.S.C. § 371, which claims priority to Japanese Patent Application No. 2017-231794 (filed on Dec. 1, 2017), which are all hereby incorporated by reference in their entirety.

TECHNICAL FIELD

The present disclosure relates to an encoding device, an encoding method, a decoding device, and a decoding method, and particularly relates to an encoding device, an encoding method, a decoding device, and a decoding method capable of generating a more accurate three-dimensional model.

BACKGROUND ART

A conventional method used to generate a three-dimensional model generates silhouette images using a difference between a foreground image and a background image, and applies volume intersection to the silhouette images from multiple viewpoints to reconstruct a visual hull (area of intersection).

For example, Patent Document 1 discloses a method of reconstructing a three-dimensional model in which a visual hull reconstructed using subject silhouette images from multiple viewpoints by volume intersection is repeatedly subjected to shaping until the shaping of the visual hull converges.

CITATION LIST

Patent Document

Patent Document 1: Japanese Patent Application Laid-Open No. 2012-208759

SUMMARY OF THE INVENTION

Problems to be Solved by the Invention

Now, in a case where a foreground color and a background color are similar in generating the silhouette image using the difference between the foreground image and the background image as described above, a difference in color is small so that it has been difficult to generate an accurate silhouette image in some cases. Therefore, the application of volume intersection to such a silhouette image has resulted in generating a three-dimensional model having low accuracy.

The present disclosure has been made in view of such circumstances, and is intended to be able to generate a more accurate three-dimensional model.

Solutions to Problems

An encoding device according to a first aspect of the present disclosure includes: a three-dimensional model generating unit that generates three-dimensional model information representing a three-dimensional model of a subject on the basis of a plurality of captured images obtained by imaging the subject from a plurality of viewpoints, and active depth information indicating a distance to the subject from a viewpoint different from viewpoints of the plurality of captured images; a conversion processing unit that converts the three-dimensional model represented by the three-dimensional model information into a plurality of two-dimensional images by projecting the three-dimensional model from a plurality of directions, and generates depth information representing a depth from an arbitrary viewpoint to the three-dimensional model by using the plurality of two-dimensional images; and a transmission unit that transmits transmit data including the plurality of two-dimensional images and the depth information to a decoding device.

An encoding method according to the first aspect of the present disclosure includes: generating three-dimensional model information representing a three-dimensional model of a subject on the basis of a plurality of captured images obtained by imaging the subject from a plurality of viewpoints, and active depth information indicating a distance to the subject from a viewpoint different from viewpoints of the plurality of captured images; converting the three-dimensional model represented by the three-dimensional model information into a plurality of two-dimensional images by projecting the three-dimensional model from a plurality of directions, and generating depth information representing a depth from an arbitrary viewpoint to the three-dimensional model by using the plurality of two-dimensional images; and transmitting transmit data including the plurality of two-dimensional images and the depth information to the decoding device.

In the first aspect of the present disclosure, the three-dimensional model information representing the three-dimensional model of the subject is generated on the basis of the plurality of captured images obtained by imaging the subject from the plurality of viewpoints, and a plurality of pieces of the active depth information indicating the distance to the subject from the viewpoint different from viewpoints of the plurality of captured images, the three-dimensional model represented by the three-dimensional model information is converted into the plurality of two-dimensional images by projecting the three-dimensional model from the plurality of directions, the depth information representing the depth from the arbitrary viewpoint to the three-dimensional model is generated by using the plurality of two-dimensional images, and the transmit data including the plurality of two-dimensional images and the depth information is transmitted to the decoding device.

A decoding device according to a second aspect of the present disclosure includes: a reception unit that receives transmit data including a plurality of two-dimensional images and depth information, the transmit data being transmitted after three-dimensional model information representing a three-dimensional model of a subject is generated on the basis of a plurality of captured images obtained by imaging the subject from a plurality of viewpoints and active depth information indicating a distance to the subject from a viewpoint different from viewpoints of the plurality of captured images, the three-dimensional model represented by the three-dimensional model information is converted into the plurality of two-dimensional images by projecting the three-dimensional model from a plurality of directions, and the depth information representing a depth from an arbitrary viewpoint to the three-dimensional model is generated by using the plurality of two-dimensional images; and a three-dimensional data conversion processing unit that converts the plurality of two-dimensional images and the depth information into the three-dimensional model information representing the three-dimensional model of the subject.

A decoding method according to the second aspect of the present disclosure includes: receiving transmit data including a plurality of two-dimensional images and depth information, the transmit data being transmitted after three-dimensional model information representing a three-dimensional model of a subject is generated on the basis of a plurality of captured images obtained by imaging the subject from a plurality of viewpoints and active depth information indicating a distance to the subject from a viewpoint different from viewpoints of the plurality of captured images, the three-dimensional model represented by the three-dimensional model information is converted into the plurality of two-dimensional images by projecting the three-dimensional model from a plurality of directions, and the depth information representing a depth from an arbitrary viewpoint to the three-dimensional model is generated by using the plurality of two-dimensional images; and converting the plurality of two-dimensional images and the depth information into the three-dimensional model information representing the three-dimensional model of the subject.

In the second aspect of the present disclosure, the transmit data including the plurality of two-dimensional images and the depth information is received, and the plurality of two-dimensional images and the depth information are converted into the three-dimensional model information representing the three-dimensional model of the subject, the transmit data being transmitted after the three-dimensional model information representing the three-dimensional model of the subject is generated on the basis of the plurality of captured images obtained by imaging the subject from the plurality of viewpoints and a plurality of pieces of the active depth information indicating the distance to the subject from the viewpoint different from viewpoints of the plurality of captured images, the three-dimensional model represented by the three-dimensional model information is converted by being projected from the plurality of directions, and the depth information representing the depth from the arbitrary viewpoint to the three-dimensional model is generated by using the plurality of two-dimensional images.

Effects of the Invention

According to the first and second aspects of the present disclosure, a more accurate three-dimensional model can be generated.

Note that the present disclosure has an effect not necessarily limited to the one described herein, but may have any effect described in the present disclosure.

BRIEF DESCRIPTION OF DRAWINGS

FIG. 8 is a diagram for explaining removal of a shadow of a subject.

FIG. 16 is a table illustrating an example of a first data format of a correction amount table.

FIG. 18 is a table illustrating an example of a second data format of the correction amount table.

FIG. 20 is a table illustrating an example of a third data format of the correction amount table.

FIG. 29 is a block diagram illustrating an example of a configuration of an embodiment of a computer to which the present technology is applied.

MODES FOR CARRYING OUT THE INVENTION

A specific embodiment to which the present technology is applied will now be described in detail with reference to the drawings.

<First Example of Configuration of Free Viewpoint Video Transmission System>

Figure 1:
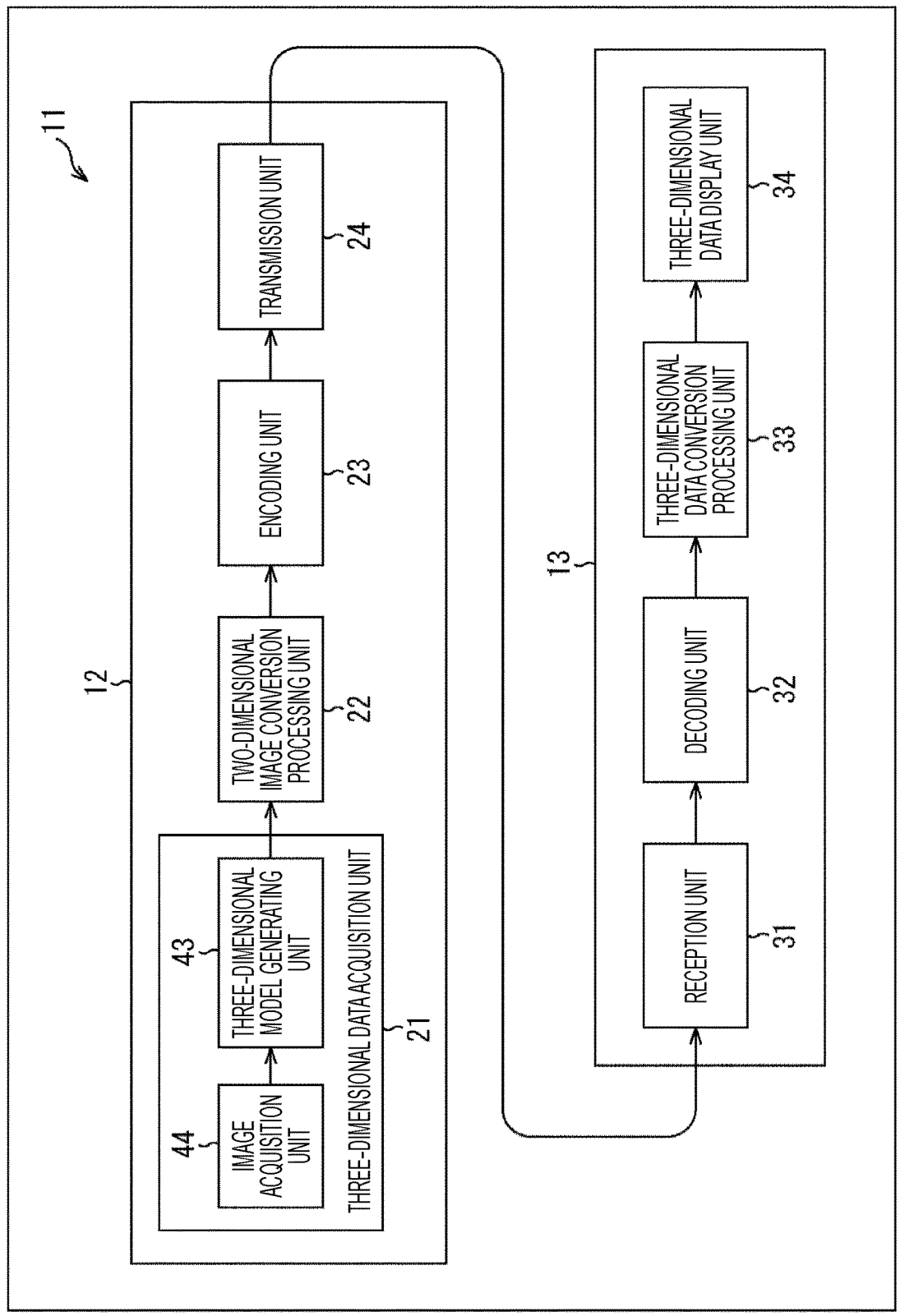
FIG. 1 is a block diagram illustrating an example of a configuration of an embodiment of a free viewpoint video transmission system to which the present technology is applied.

FIG. 1 is a block diagram illustrating an example of a configuration of an embodiment of a free viewpoint video transmission system to which the present technology is applied.

As illustrated in FIG. 1, a free viewpoint video transmission system 11 includes an encoding system 12 and a decoding system 13 that are connected via a network, and the encoding system 12 transmits encoded transmit data to the decoding system 13. Also, the encoding system 12 includes a three-dimensional data acquisition unit 21, a two-dimensional image conversion processing unit 22, an encoding unit 23, and a transmission unit 24, and the decoding system 13 includes a reception unit 31, a decoding unit 32, a three-dimensional data conversion processing unit 33, and a three-dimensional data display unit 34.

The three-dimensional data acquisition unit 21 includes an image acquisition unit 44 and a three-dimensional model generating unit 43. The image acquisition unit 44 acquires a plurality of camera images in which a subject is imaged from a plurality of viewpoints, and also acquires a plurality of pieces of active depth information indicating a distance from another plurality of viewpoints to the subject. Then, the three-dimensional model generating unit 43 generates three-dimensional model information representing a three-dimensional model of the subject on the basis of the plurality of camera images and the plurality of pieces of active depth information, and supplies the three-dimensional model information to the two-dimensional image conversion processing unit 22. Note that the three-dimensional data acquisition unit 21 may acquire one piece of active depth information indicating a distance from at least one viewpoint to the subject, and generate three-dimensional model information on the basis of the active depth information.

The two-dimensional image conversion processing unit 22 for example performs two-dimensional image conversion processing in which the three-dimensional model represented by the three-dimensional model information supplied from the three-dimensional data acquisition unit 21 is subjected to perspective projection from a plurality of directions and converted into a plurality of two-dimensional images. The two-dimensional image conversion processing unit 22 can also add depth information (image based depth) to each of the plurality of two-dimensional images by matching feature points in two of the two-dimensional images with parallax, the depth information being generated by estimating the depth by triangulation. For example, the depth information represents the depth from an arbitrary viewpoint to the three-dimensional model and may indicate, for example, a position in the depth direction of the subject from the same viewpoint as the two-dimensional image for each pixel, or a position in the depth direction of the subject from a viewpoint different from that of the two-dimensional image for each pixel. Moreover, the number of viewpoints of the two-dimensional image and the number of viewpoints of the depth information may be the same or different. Note that an example of the configuration of the two-dimensional image conversion processing unit 22 will be described later with reference to FIG. 4.

The encoding unit 23 encodes transmit data to be transmitted from the encoding system 12 to the decoding system 13. For example, the transmit data includes the plurality of pieces of active depth information acquired by the three-dimensional data acquisition unit 21, the plurality of two-dimensional images obtained by the conversion by the two-dimensional image conversion processing unit 22, the depth information, and the like. The encoding unit 23 can encode the two-dimensional images included in the transmit data using a two-dimensional compression technique such as 3D multiview video coding (MVC), MVC, or advanced video coding (AVC), for example.

The transmission unit 24 transmits the transmit data supplied from the encoding unit 23 to the decoding system 13 via the network.

The reception unit 31 receives the transmit data transmitted from the transmission unit 24 via the network such as the transmit data including the plurality of two-dimensional images, the plurality of pieces of active depth information, and the like, thereby supplying the transmit data to the decoding unit 32.

The decoding unit 32 decodes the transmit data supplied from the reception unit 31, and supplies the plurality of two-dimensional images and depth information, the plurality of pieces of active depth information, and the like to the three-dimensional data conversion processing unit 33. For example, the decoding unit 32 can decode the two-dimensional images included in the transmit data by using the same two-dimensional compression technique as that used in encoding by the encoding unit 23.

The three-dimensional data conversion processing unit 33 performs conversion processing of converting the plurality of two-dimensional images supplied from the decoding unit 32 into the three-dimensional model information representing the three-dimensional model of the subject, and supplies the three-dimensional model information to the three-dimensional data display unit 34. For example, when reconstructing the three-dimensional model using the plurality of two-dimensional images, the three-dimensional data conversion processing unit 33 can reconstruct the three-dimensional model with high accuracy by using the depth information added to the two-dimensional images, the plurality of pieces of active depth information, and the like. Note that an example of the configuration of the three-dimensional data conversion processing unit 33 will be described later with reference to FIG. 5.

For the three-dimensional data display unit 34, a head mounted display, a two-dimensional monitor, a three-dimensional monitor, or the like can be used, for example, and the three-dimensional model represented by the three-dimensional model information supplied from the three-dimensional data conversion processing unit 33 is displayed on any of those display devices. Note that there may be adopted a configuration in which the functions of the reception unit 31 to the three-dimensional data display unit 34 are included in a single head mounted display, or a configuration in which the three-dimensional data display unit 34 including a head mounted display is connected to an information processing terminal including the functions of the reception unit 31 to the three-dimensional data conversion processing unit 33.

In the free viewpoint video transmission system 11 configured as described above, the three-dimensional data acquisition unit 21 can generate the three-dimensional model with high accuracy by using the plurality of pieces of active depth information when generating the three-dimensional model information from the plurality of camera images. As a result, the encoding system 12 can encode and transmit the transmit data used to generate the three-dimensional model having high accuracy. Then, in the free viewpoint video transmission system 11, the three-dimensional data conversion processing unit 33 can generate the three-dimensional model with high accuracy from the plurality of two-dimensional images by using the plurality of pieces of active depth information transmitted along with the plurality of two-dimensional images.

An RGB camera 41 and an active sensor 42 that supply the camera image and active depth information to the three-dimensional data acquisition unit 21 will be described with reference to FIG. 2.

Figure 2:
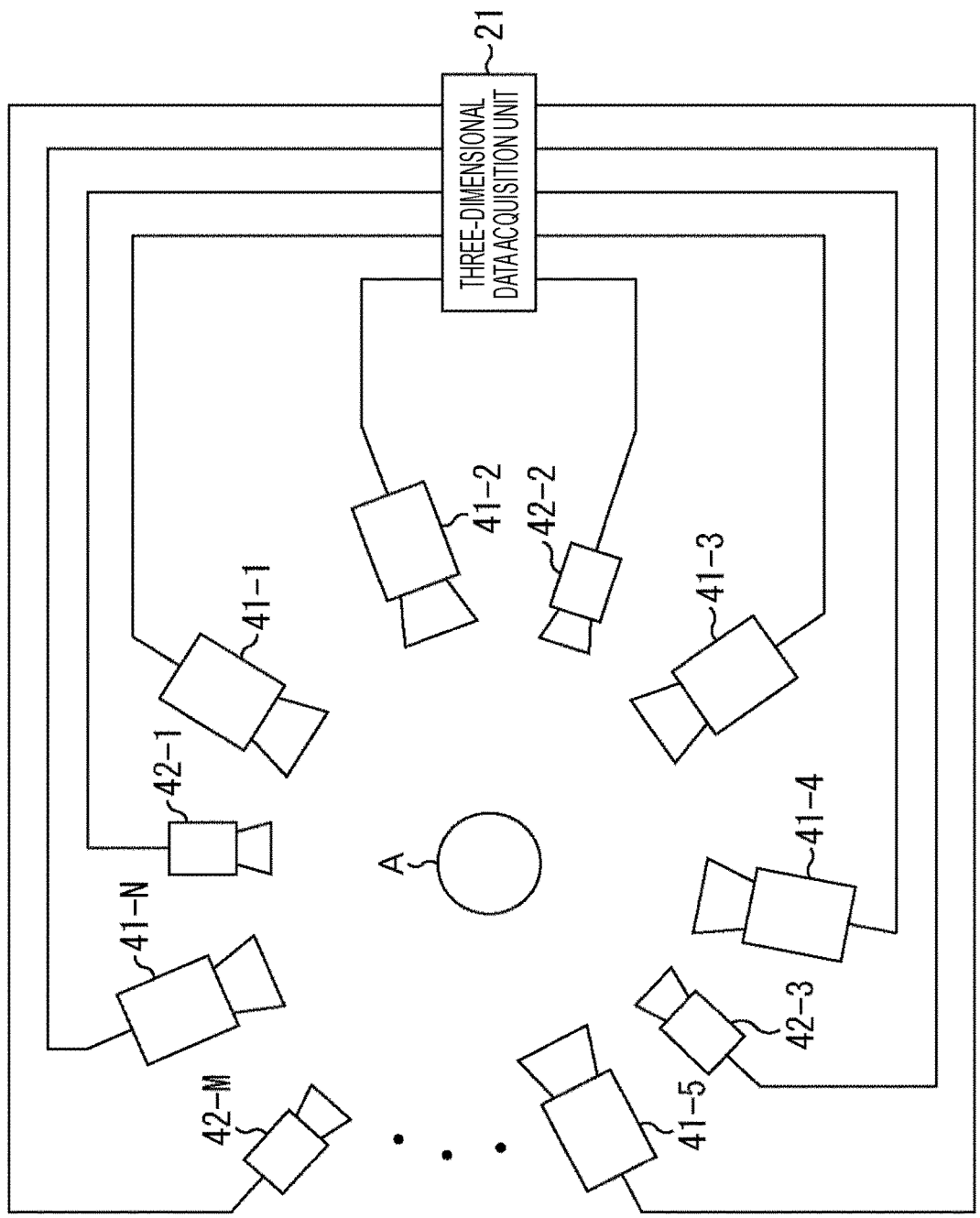
FIG. 2 is a diagram illustrating an example of the arrangement of RGB cameras and active sensors.

As illustrated in FIG. 2, the three-dimensional data acquisition unit 21 is connected to N pieces of RGB cameras 41-1 to 41-N and M pieces of active sensors 42-1 to 42-M.

The RGB cameras 41-1 to 41-N and the active sensors 42-1 to 42-M are arranged at positions surrounding a subject A, and are installed so as to face the subject A from their respective positions. Moreover, camera calibration is performed in advance on the RGB cameras 41-1 to 41-N and the active sensors 42-1 to 42-M, and their positional relationship is used as a camera parameter.

The RGB cameras 41-1 to 41-N image the subject A from their respective positions, acquire N pieces of camera images (RGB images), and supply them to the three-dimensional data acquisition unit 21. Note that the RGB cameras 41-1 to 41-N will be hereinafter simply referred to as the RGB cameras 41 as appropriate in a case where the RGB cameras 41-1 to 41-N need not be distinguished from one another.

The active sensors 42-1 to 42-M obtain distances from their respective positions to the subject A, and supply M pieces of active depth information indicating the distances obtained to the three-dimensional data acquisition unit 21. For example, the active sensors 42-1 to 42-M can each use a TOF sensor that acquires a distance image by measuring the time of flight from when light is emitted toward the subject A to when the light reflected by the subject A is received as reflected light. Moreover, in addition to the TOF sensor, a range sensor such as a light detection and ranging (LIDAR) or structured light sensor may be used for each of the active sensors 42-1 to 42-M. Note that the active sensors 42-1 to 42-M will be hereinafter simply referred to as the active sensors 42 as appropriate in a case where the active sensors 42-1 to 42-M need not be distinguished from one another. Note that at least one active sensor 42 or more need only be included.

The three-dimensional model generating unit 43 of the three-dimensional data acquisition unit 21 generates three-dimensional model information representing a three-dimensional model of the subject A on the basis of the N pieces of camera images and the M pieces of active depth information.

An example of a detailed configuration of the three-dimensional model generating unit 43 will be described with reference to FIG. 3.

Figure 3:
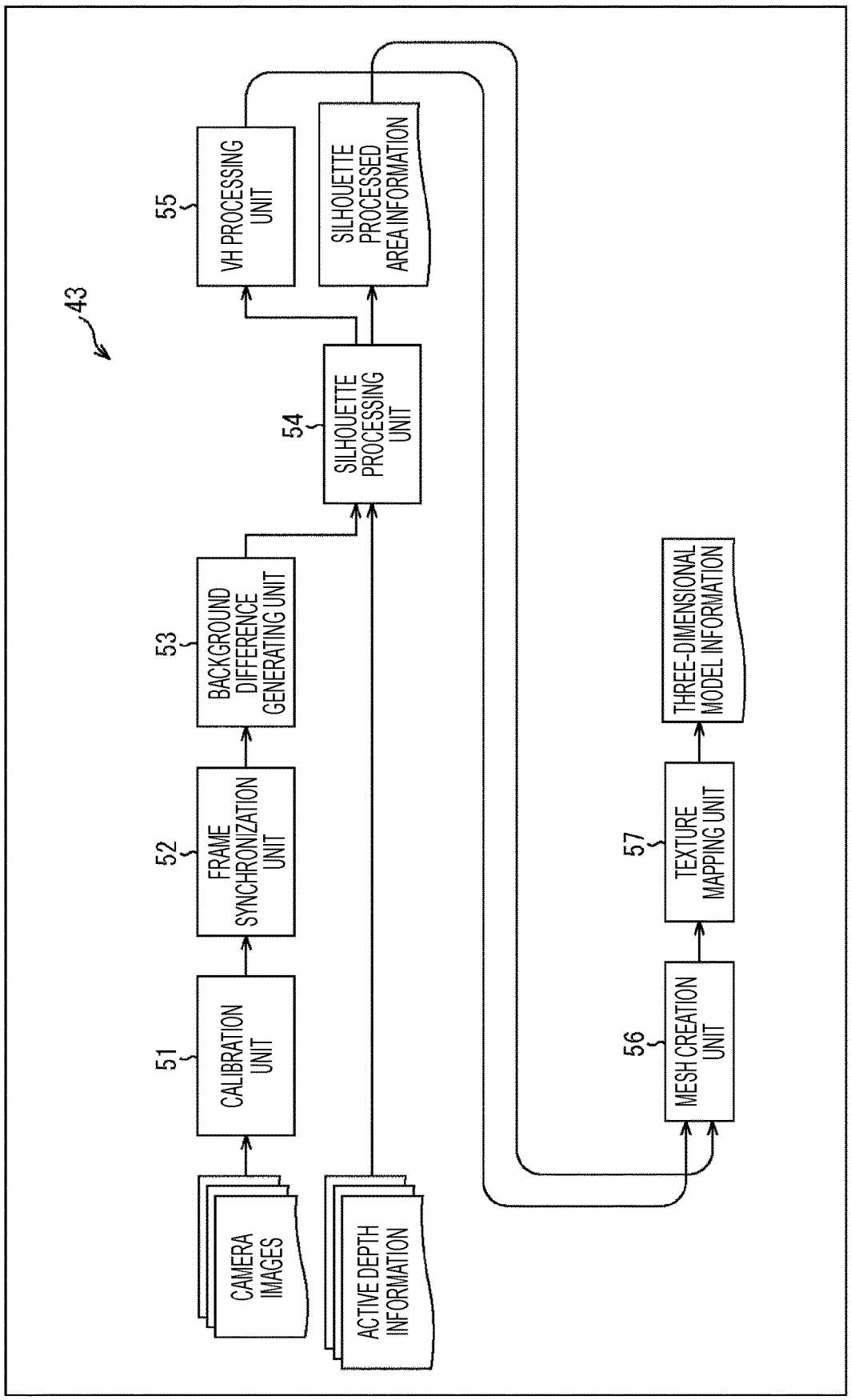
FIG. 3 is a block diagram illustrating an example of a configuration of a three-dimensional model generating unit.

As illustrated in FIG. 3, the three-dimensional model generating unit 43 includes a calibration unit 51, a frame synchronization unit 52, a background difference generating unit 53, a silhouette processing unit 54, a visual hull (VH) processing unit 55, a mesh creation unit 56, and a texture mapping unit 57. Also, as described above, the three-dimensional model generating unit 43 is supplied with the plurality of camera images from the plurality of RGB cameras 41 and the plurality of pieces of active depth information from the plurality of active sensors 42 via the image acquisition unit 44.

The calibration unit 51 supplies, to the frame synchronization unit 52, the camera images after calibration that are corrected using internal parameters, and external parameters representing the relationship among the RGB cameras 41. Similarly, the calibration unit 51 can perform calibration on the active depth information supplied from the active sensors 42.

A method of the calibration includes, for example, a Zhang's method using a chessboard, a method of obtaining a parameter by imaging a three-dimensional object, a method of obtaining a parameter using a projected image with a projector, and the like. Camera parameters include, for example, internal parameters and external parameters. The internal parameters are parameters unique to a camera and include camera lens distortion and inclination of image sensor and lens (distortion coefficients), an image center, and an image (pixel) size. The external parameters indicate the positional relationship among a plurality of cameras if present, and also indicate the center coordinates (translation) of the lens and the orientation (rotation) of an optical axis of the lens in a world coordinate system.

The frame synchronization unit 52 sets one of the plurality of RGB cameras 41 as a base camera and the rest as reference cameras. Then, the frame synchronization unit 52 synchronizes frames of the camera images of the reference cameras with a frame of the camera image of the base camera. The frame synchronization unit 52 supplies the camera images obtained after the frame synchronization to the background difference generating unit 53.

The background difference generating unit 53 performs background difference processing on the plurality of camera images to generate a plurality of silhouette images as masks for extracting a subject (foreground), and supplies the silhouette images to the silhouette processing unit 54. For example, the silhouette image is represented by binarizing a silhouette that indicates a range where the subject is shown in the camera image.

The silhouette processing unit 54 projects the plurality of pieces of active depth information onto the plurality of silhouette images supplied from the background difference generating unit 53, thereby performing processing on a corruption occurring in the silhouette of each silhouette image. For example, the silhouette processing unit 54 performs processing such as filling a hole appearing in the silhouette of the silhouette image (see FIG. 6 described later), or removing a shadow of the subject appearing as the silhouette in the silhouette image (see FIG. 7 described later). Then, the silhouette processing unit 54 supplies the plurality of silhouette images that has been subjected to the processing to the VH processing unit 55. The silhouette processing unit 54 also outputs silhouette processed area information indicating an area where the silhouette has been subjected to the processing such as filling the hole or removing the shadow. Note that the silhouette processing unit 54 can perform processing to remove a floor, a wall, or the like that appears as the silhouette in the silhouette image.

The VH processing unit 55 performs modeling by visual hull or the like using the plurality of silhouette images processed by the silhouette processing unit 54 and the camera parameters. The VH processing unit 55 projects each of the silhouette images back into the original three-dimensional space, and obtains an intersection (visual hull) of the view volumes.

The mesh creation unit 56 creates a mesh for the visual hull obtained by the VH processing unit 55.

The texture mapping unit 57 generates geometric information (geometry) and the camera image corresponding to the mesh as a three-dimensional model of the subject after texture mapping, the geometric information indicating three-dimensional positions of points (vertices) included in the mesh created by the mesh creation unit 56 and a connection of the points (polygon). Then, the texture mapping unit 57 supplies three-dimensional model information representing the three-dimensional model generated to the two-dimensional image conversion processing unit 22.

The three-dimensional model generating unit 43 is configured as described above and can generate a more accurate three-dimensional model by improving the corruption of the silhouette using the active depth information. Moreover, the use of the active depth information can automate the improvement of the silhouette without the need for manual processing and processing using likelihood as compared to a method of improving the corruption of the silhouette by the manual processing or the processing using likelihood, for example.

The three-dimensional model generating unit 43 can also output the silhouette processed area information indicating the area where the silhouette has been subjected to the processing. For example, in the area where the silhouette has been subjected to the processing, the depth information obtained from the plurality of camera images is likely to have low reliability, so that the silhouette processed area information is transmitted to be able to be used effectively on the receiving side when generating the three-dimensional model.

Figure 4:
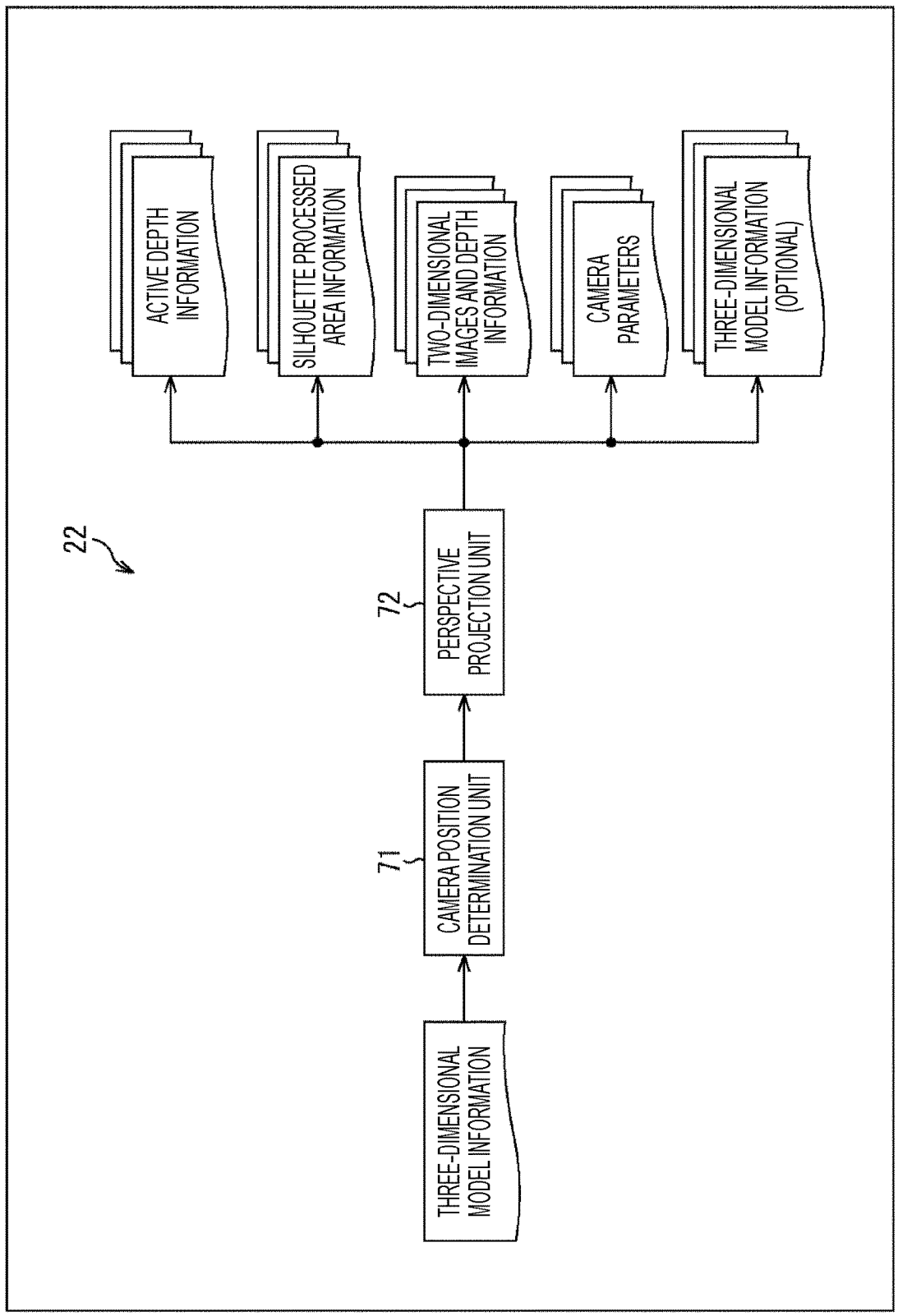
FIG. 4 is a block diagram illustrating an example of a configuration of a two-dimensional image conversion processing unit.

FIG. 4 is a block diagram illustrating an example of a configuration of the two-dimensional image conversion processing unit 22.

As illustrated in FIG. 4, the two-dimensional image conversion processing unit 22 includes a camera position determination unit 71 and a perspective projection unit 72. Also, as described above, the two-dimensional image conversion processing unit 22 is supplied with the three-dimensional model information from the three-dimensional data acquisition unit 21.

The camera position determination unit 71 determines camera positions at a plurality of viewpoints corresponding to a predetermined display image generation scheme and camera parameters of the camera positions, and supplies information representing the camera positions and the camera parameters to the perspective projection unit 72.

The perspective projection unit 72 performs perspective projection of the three-dimensional model represented by the three-dimensional model information for each viewpoint on the basis of the camera parameters of the plurality of viewpoints supplied from the camera position determination unit 71. The perspective projection unit 72 thus acquires a plurality of two-dimensional images obtained by the perspective projection of the three-dimensional model from each viewpoint. The perspective projection unit 72 also adds depth information generated from those two-dimensional images to the corresponding two-dimensional images and outputs the information.

Then, the transmit data including the active depth information, the silhouette processed area information, the plurality of two-dimensional images and depth information, and the camera parameters is transmitted from the encoding system 12 to the decoding system 13. Note that the three-dimensional model information itself may be transmitted as an option.

Figure 5:
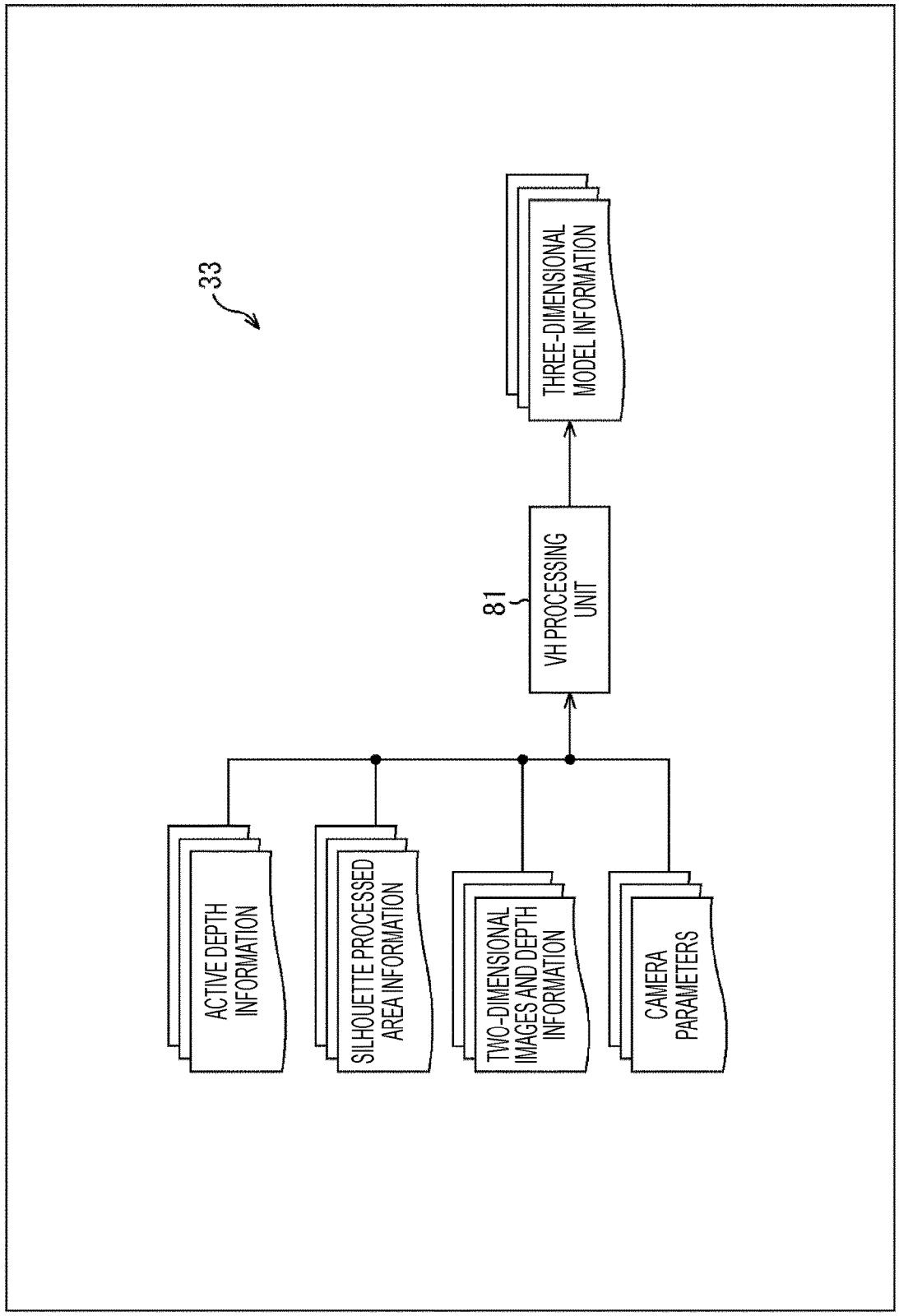
FIG. 5 is a block diagram illustrating an example of a configuration of a three-dimensional data conversion processing unit.

FIG. 5 is a block diagram illustrating an example of a configuration of the three-dimensional data conversion processing unit 33.

The three-dimensional data conversion processing unit 33 includes a VH processing unit 81. The three-dimensional data conversion processing unit 33 is supplied with the plurality of pieces of active depth information, the plurality of pieces of silhouette processed area information, the plurality of two-dimensional images and depth information, and the camera parameters included in the transmit data transmitted from the encoding system 12.

As with the VH processing unit 55 of FIG. 3, the VH processing unit 81 performs modeling with a visual hull or the like using the plurality of pieces of active depth information, the plurality of pieces of silhouette processed area information, the plurality of two-dimensional images and depth information, and the camera parameters. At this time, the VH processing unit 81 can perform the modeling with high accuracy by referring to the active depth information and the silhouette processed area information. In other words, the area where the silhouette has been subjected to processing (such as filling a hole or removing a shadow) is highly likely to be an area where the depth information obtained from the two-dimensional image has low reliability. Therefore, the VH processing unit 81 can generate a more accurate three-dimensional model by reconstructing the three-dimensional model using the active depth information and the silhouette processed area information.

An example of improvement by projecting the active depth information will be described with reference to FIGS. 6 and 7.

Figure 6:
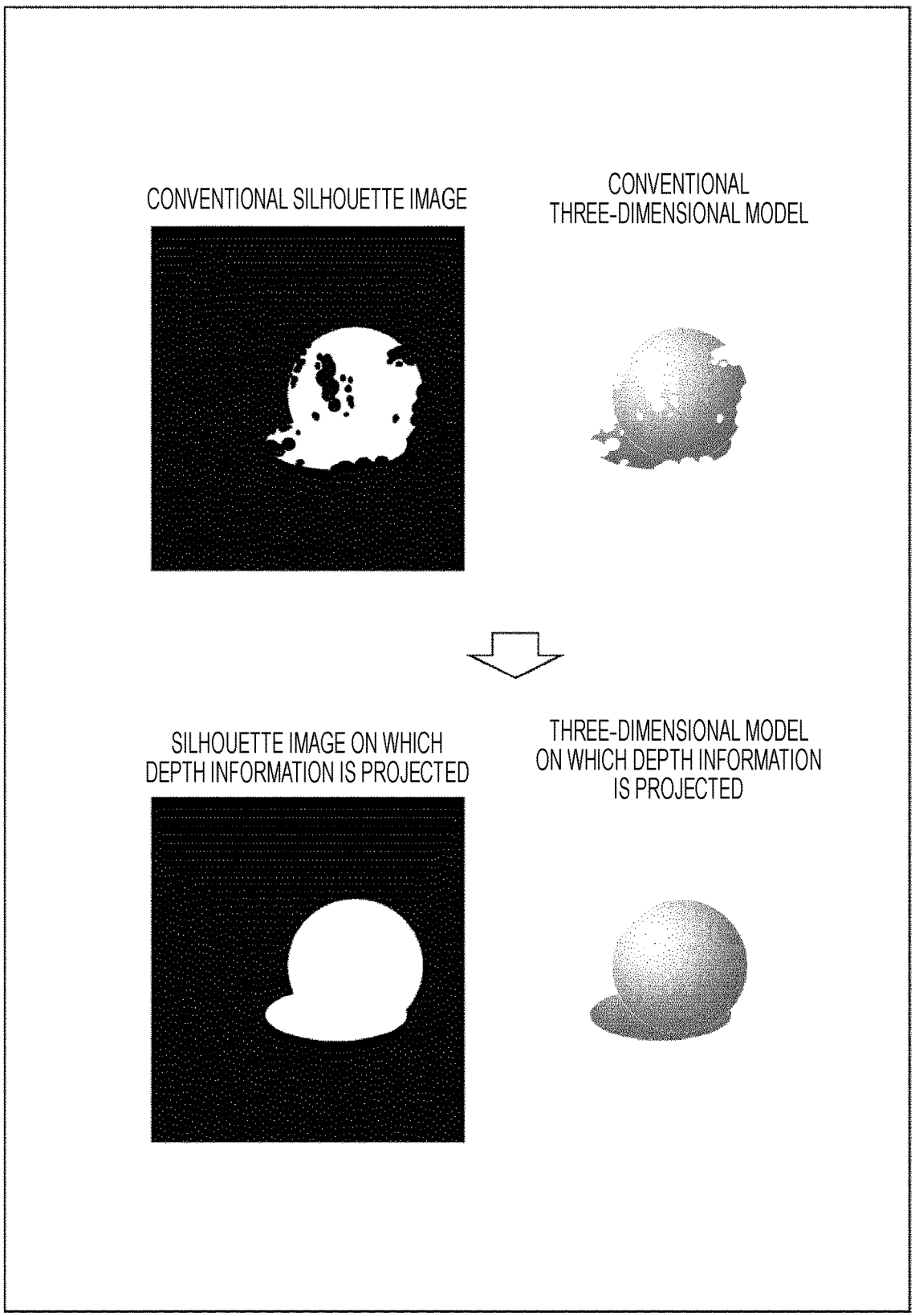
FIG. 6 is a diagram illustrating an example of improvement by projecting active depth information.

For example, as illustrated in an upper part of FIG. 6, a silhouette image generated using a background difference has areas where a subject appears to have holes in areas with a small difference between a foreground color and a background color. Therefore, a three-dimensional model reconstructed using such a silhouette image results in a corruption of the shape of the subject.

On the other hand, as illustrated in a lower part of FIG. 6, the areas where the subject appears to have holes can be filled by projecting the active depth information onto the silhouette image generated using the background difference. In other words, the silhouette image accurately reproducing the silhouette of the subject can be generated, and the use of such a silhouette image can generate a three-dimensional model in which the shape of the subject is reconstructed with high accuracy without corruption.

Figure 7:
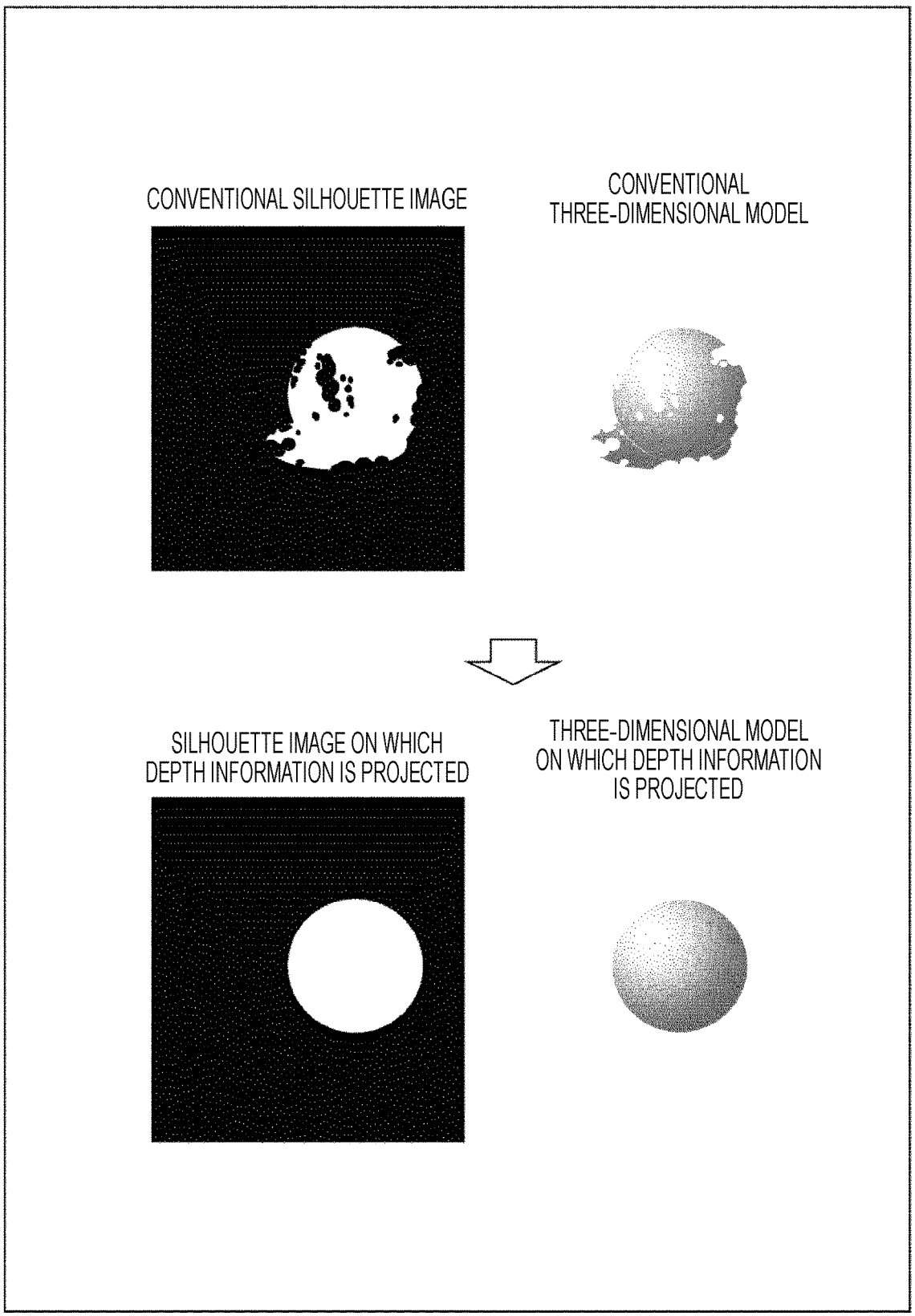
FIG. 7 is a diagram illustrating an example of improvement by projecting active depth information.

Moreover, as illustrated in an upper part of FIG. 7, a silhouette image generated using a background difference has an area with a large difference between a foreground color and a background color due to a shadow of a subject, whereby the area of the shadow appears in the silhouette image. In other words, the silhouette image in which the area of the shadow of the subject also appears as the silhouette is generated, so that a three-dimensional model reconstructed using such a silhouette image results in forming a shape that does not actually exist in the area of the shadow of the subject.

On the other hand, as illustrated in a lower part of FIG. 7, the shadow of the subject can be removed from the silhouette image by projecting the active depth information onto the silhouette image generated using the background difference. As a result, the silhouette image accurately reproducing the silhouette of the subject can be generated, and by using such a silhouette image, a three-dimensional model in which the shape of the subject is reconstructed with high accuracy can be generated without forming a shape that does not actually exist in the area of the shadow.

Moreover, by removing a shadow of a subject from a silhouette image, the accuracy of separating a plurality of subjects can be improved.

That is, as illustrated in FIG. 8, in a case where a subject B and a subject C are placed close to each other with the subject B overlapping a shadow of the subject C in a camera image, a silhouette image generated using a background difference has a silhouette in which the subject B and the subject C are integrated. The plurality of subjects overlapping the shadow thereof in such a manner is falsely recognized as one subject.

On the other hand, the shadows of the subject B and the subject C can be removed from the silhouette image by projecting the active depth information onto the silhouette image generated using the background difference. Therefore, even when the subject B overlaps the shadow of the subject C, a silhouette image in which the subject B and the subject C are accurately separated can be generated. As a result, a three-dimensional model of the subject B and the subject C can be generated with high accuracy.

Furthermore, for example, the active depth information can be used as mask information for a green screen used in chroma key compositing.

Figure 9:
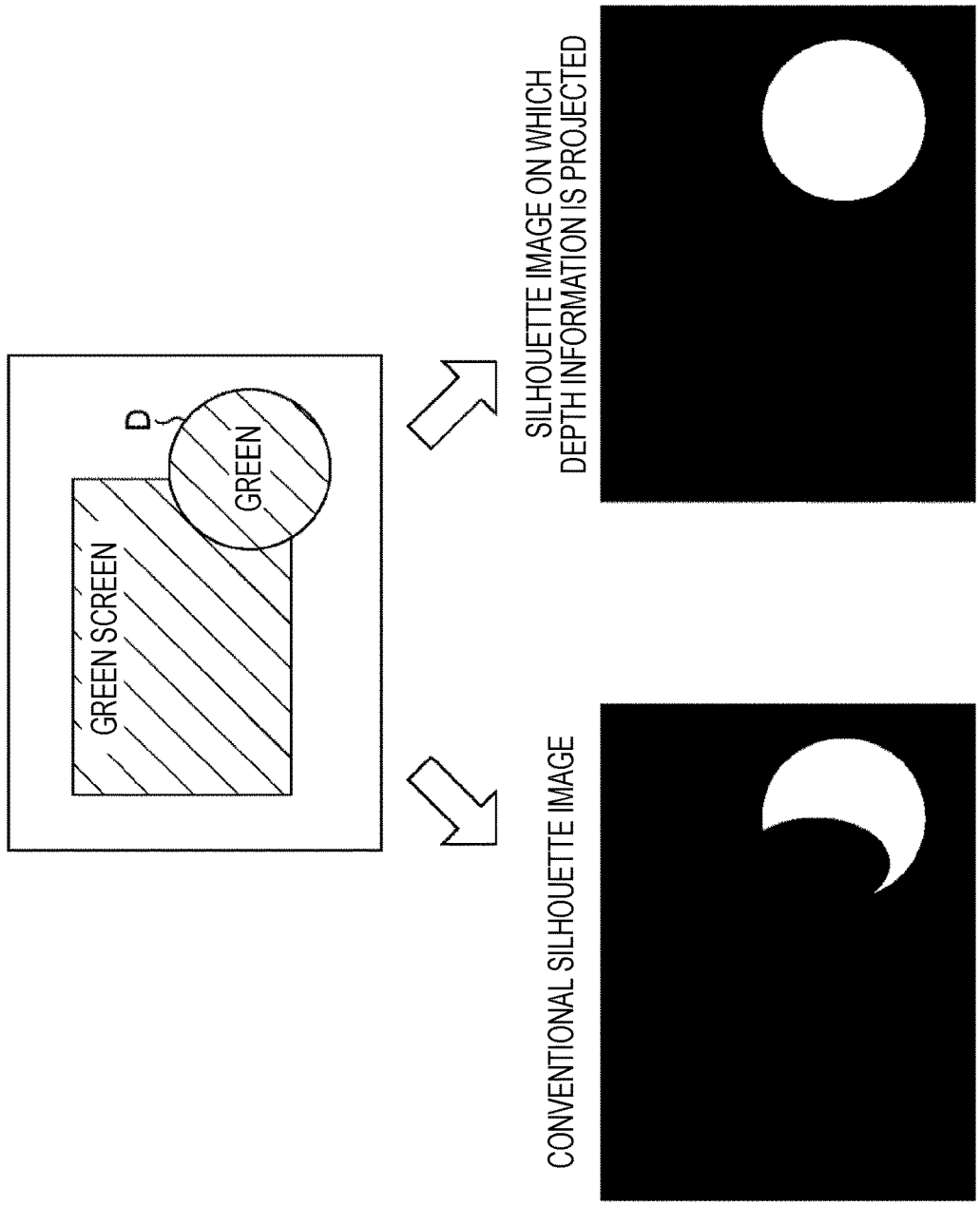
FIG. 9 is a diagram for explaining an example of use as mask information of a green screen.

That is, as illustrated in FIG. 9, in a case where a green subject D overlaps a green screen, a silhouette image generated from a camera image has not been able to generate mask information that accurately masks the subject D.

Meanwhile, the active depth information enables three-dimensional recognition of the subject D, so that the mask information accurately masking the subject D can be generated even when a foreground color and a background color are the same. Thus, by using the active depth information, the subject D having the same color as the background color can be modeled with high accuracy.

<Example of Encoding Processing and Decoding Processing>

An example of each of encoding processing and decoding processing performed in the free viewpoint video transmission system 11 will be described with reference to FIGS. 10 to 12.

Figure 10:
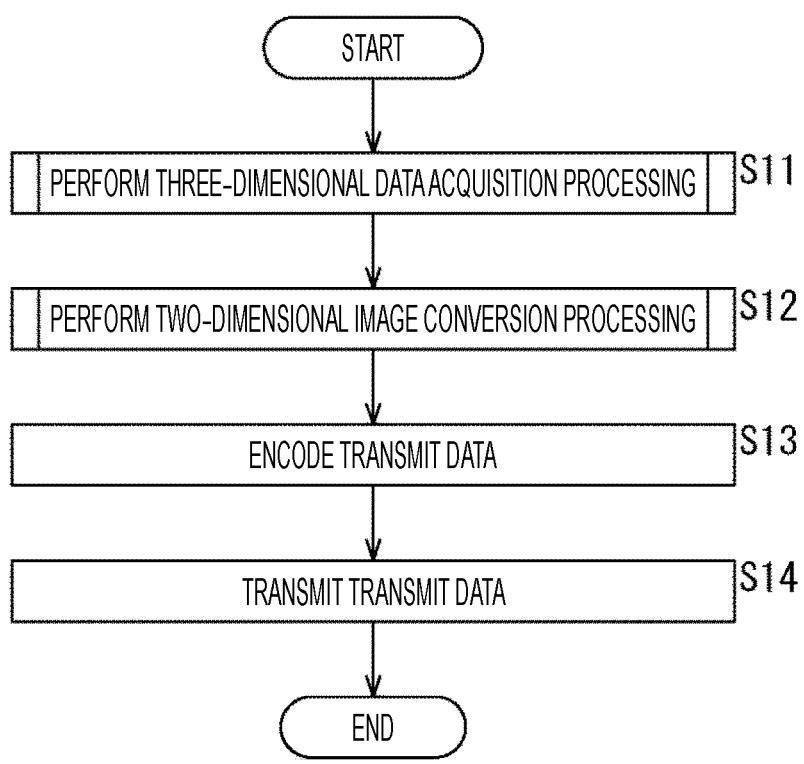
FIG. 10 is a flowchart for explaining encoding processing.

FIG. 10 is a flowchart for explaining the encoding processing performed in the encoding system 12.

In step S11, the three-dimensional data acquisition unit 21 acquires a plurality of camera images by imaging a subject using the plurality of RGB cameras 41 and acquires a plurality of pieces of active depth information indicating the distance to the subject using the plurality of active sensors 42, as illustrated in FIG. 2. Then, the three-dimensional model generating unit 43 performs three-dimensional data acquisition processing (see FIG. 11) that generates three-dimensional model information representing a three-dimensional model of the subject.

In step S12, the two-dimensional image conversion processing unit 22 performs two-dimensional image conversion processing (see FIG. 11) that converts the three-dimensional model information generated by the three-dimensional data acquisition unit 21 in step S11 into a plurality of two-dimensional images.

In step S13, the encoding unit 23 encodes transmit data including the plurality of two-dimensional images supplied from the two-dimensional image conversion processing unit 22 in step S12, and supplies the transmit data to the transmission unit 24. The transmit data also includes, as described above, the active depth information, the silhouette processed area information, the plurality of two-dimensional images and depth information, and the camera parameters.

In step S14, the transmission unit 24 transmits the transmit data supplied from the encoding unit 23 in step S13 to the decoding system 13 via the network, and then the encoding processing is ended.

Figure 11:
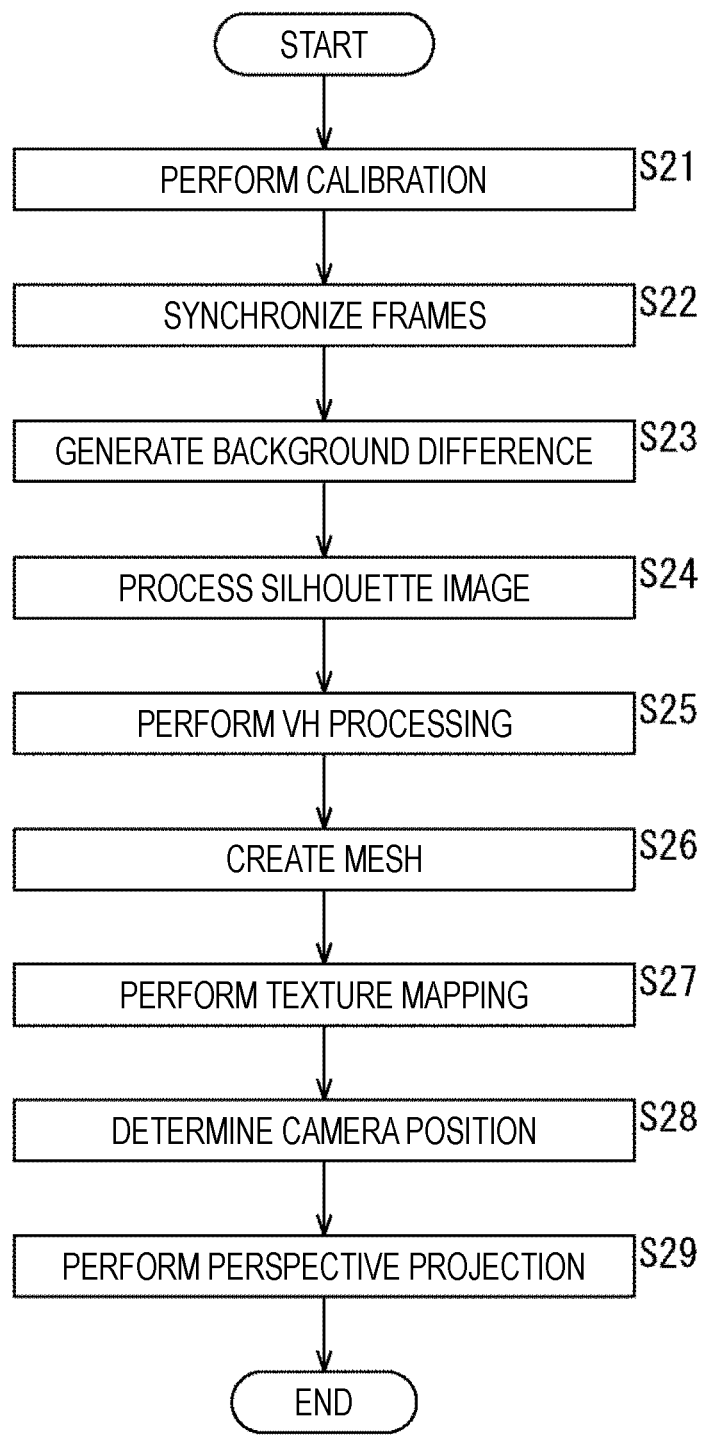
FIG. 11 is a flowchart for explaining three-dimensional data acquisition processing and two-dimensional image conversion processing.

FIG. 11 is a flowchart for explaining the three-dimensional data acquisition processing in step S11 and the two-dimensional image conversion processing in step S12 of FIG. 10.

In step S21, the calibration unit 51 supplies, to the frame synchronization unit 52, the camera images after calibration that are corrected using internal parameters, and external parameters representing the relationship among the RGB cameras 41.

In step S22, the frame synchronization unit 52 synchronizes frames of the plurality of camera images supplied from the calibration unit 51 in step S21, and supplies the frames to the background difference generating unit 53.

In step S23, the background difference generating unit 53 generates a plurality of silhouette images by obtaining a background difference from the plurality of camera images supplied from the frame synchronization unit 52 in step S22, and supplies the silhouette images to the silhouette processing unit 54.

In step S24, the silhouette processing unit 54 properly projects the active depth information onto the plurality of silhouette images supplied from the background difference generating unit 53 in step S23, and processes the silhouette of the plurality of silhouette images. For example, the silhouette processing unit 54 performs processing such as filling a hole appearing in the silhouette of the silhouette image or removing a shadow of the subject appearing as the silhouette in the silhouette image, and supplies the silhouette images to the VH processing unit 55. At this time, the silhouette processing unit 54 outputs silhouette processed area information indicating an area where the silhouette has been subjected to the processing such as filling the hole or removing the shadow.

In step S25, the VH processing unit 55 performs VH processing for reconstructing a visual hull using the plurality of silhouette images processed by the silhouette processing unit 54 in step S24 and the camera parameters, and supplies the visual hull to the mesh creation unit 56.

In step S26, the mesh creation unit 56 creates a mesh for the visual hull supplied from the VH processing unit 55 in step S25, and supplies the mesh to the texture mapping unit 57.

In step S27, the texture mapping unit 57 performs texture mapping on the mesh supplied from the mesh creation unit 56 in step S26 on the basis of the camera images, thereby generating a three-dimensional model. Then, the texture mapping unit 57 supplies three-dimensional model information representing the three-dimensional model generated to the camera position determination unit 71 of the two-dimensional image conversion processing unit 22.

In step S28, the camera position determination unit 71 determines a plurality of camera positions serving as viewpoints for performing perspective projection on the three-dimensional model that is represented by the three-dimensional model information supplied from the texture mapping unit 57 in step S27. Then, the camera position determination unit 71 supplies the three-dimensional model information and camera parameters indicating the plurality of camera positions to the perspective projection unit 72.

In step S29, the perspective projection unit 72 performs perspective projection on the three-dimensional model, which is represented by the three-dimensional model information supplied from the camera position determination unit 71 in step S28, by using the plurality of camera positions as the viewpoints. As a result, the perspective projection unit 72 acquires a plurality of two-dimensional images obtained by the perspective projection of the three-dimensional model from each of the viewpoints, generates depth information representing the depth from an arbitrary viewpoint to the three-dimensional model using those two-dimensional images, and supplies the two-dimensional images and the depth information to the encoding unit 23, whereby the processing is ended.

Figure 12:
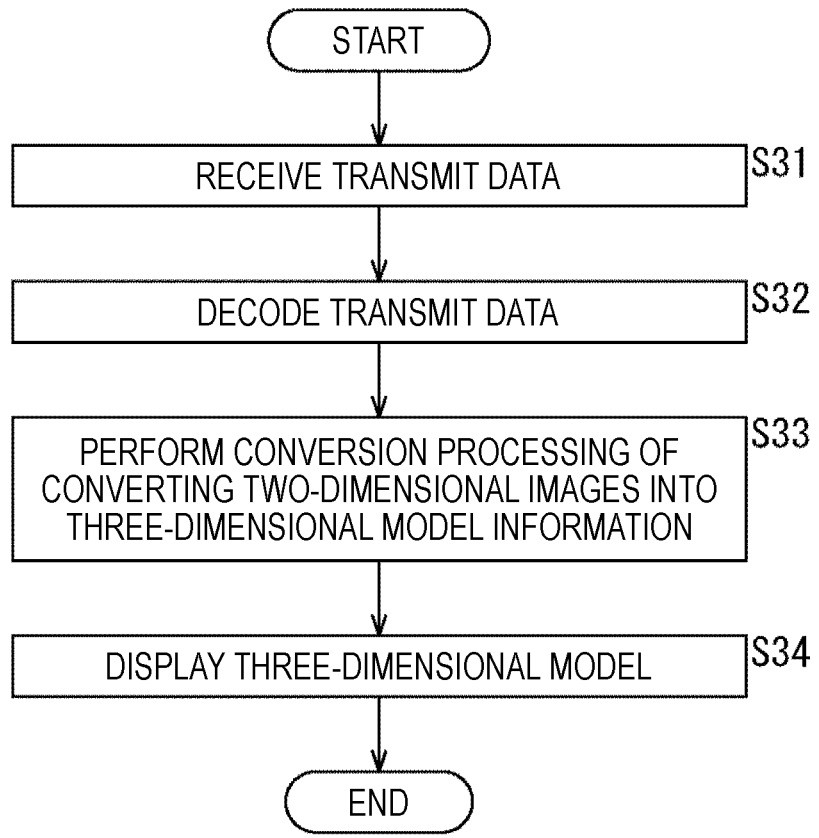
FIG. 12 is a flowchart for explaining decoding processing.

FIG. 12 is a flowchart for explaining the decoding processing performed in the decoding system 13.

In step S31, the reception unit 31 receives the transmit data transmitted in step S14 of FIG. 10 and supplies the transmit data to the decoding unit 32.

In step S32, the decoding unit 32 decodes the transmit data supplied from the reception unit 31 in step S31, and supplies the active depth information, the silhouette processed area information, the plurality of two-dimensional images and depth information, and the camera parameters to the three-dimensional data conversion processing unit 33.

In step S33, the three-dimensional data conversion processing unit 33 performs conversion processing that converts the plurality of two-dimensional images into the three-dimensional model information using the active depth information, the silhouette processed area information, the depth information, and the camera parameters. Then, the three-dimensional data conversion processing unit 33 supplies the three-dimensional model information to the three-dimensional data display unit 34.

In step S34, the three-dimensional data display unit 34 displays the three-dimensional model, which is represented by the three-dimensional model information supplied from the three-dimensional data conversion processing unit 33 in step S33, on a display unit such as a head mounted display, a two-dimensional monitor, or a three-dimensional monitor. After that, the decoding processing is ended.

<Variations of Three-Dimensional Model Generating Unit>

Variations of the three-dimensional model generating unit 43 will be described with reference to FIGS. 13 to 15. Note that in each variation described below, a block common to that of the three-dimensional model generating unit 43 in FIG. 3 will be assigned the same reference numeral as that assigned to such a block in FIG. 3, whereby detailed description thereof will be omitted.

Figure 13:
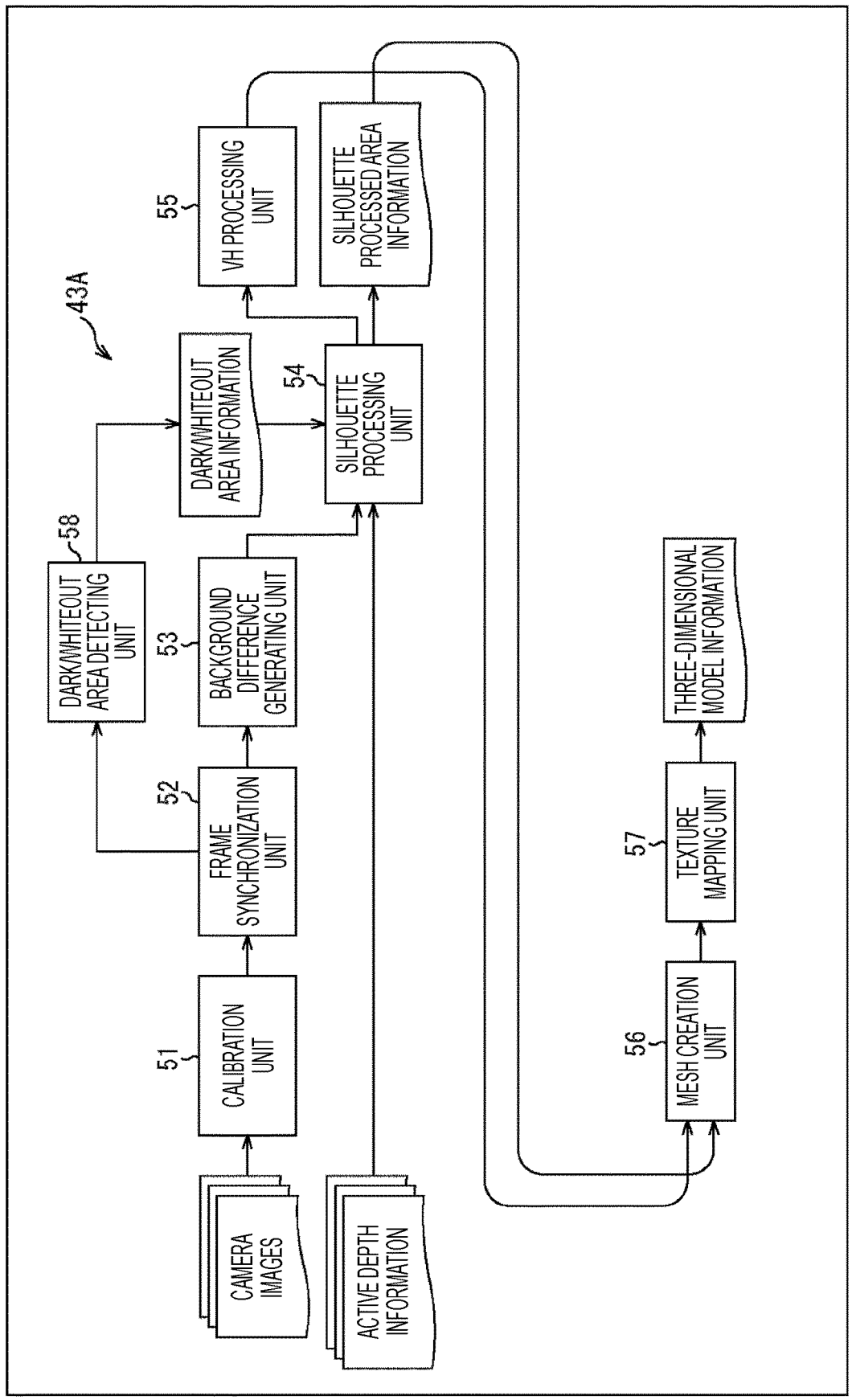
FIG. 13 is a diagram for explaining a first variation of a three-dimensional model generating unit.

FIG. 13 illustrates a block diagram of a three-dimensional model generating unit 43A being a first variation.

As illustrated in FIG. 13, the three-dimensional model generating unit 43A has a configuration common to that of the three-dimensional model generating unit 43 of FIG. 3 in terms of including the calibration unit 51, the frame synchronization unit 52, the background difference generating unit 53, the silhouette processing unit 54, the VH processing unit 55, the mesh creation unit 56, and the texture mapping unit 57. The three-dimensional model generating unit 43A further includes a dark/whiteout area detecting unit 58.

The dark/whiteout area detecting unit 58 detects, in the camera images supplied from the frame synchronization unit 52, a dark area having a predetermined brightness value or lower and a whiteout area having a predetermined brightness value or higher. Then, the dark/whiteout area detecting unit 58 supplies dark/whiteout area information indicating the dark area or whiteout area to the silhouette processing unit 54.

Therefore, in the three-dimensional model generating unit 43A, the silhouette processing unit 54 can process the silhouette images by projecting the active depth information onto the dark area or whiteout area with reference to the dark/whiteout area information.

For example, when the silhouette image is generated using the camera image captured by the RGB camera 41 in FIG. 2, the silhouette is corrupted or has a large amount of noise in the dark area or whiteout area. Meanwhile, the active sensor 42 in FIG. 2 acquires the active depth information using light in the infrared wavelength region, and can thus acquire the active depth information even in an environment where the brightness value is lower or higher than or equal to a predetermined brightness value.

Therefore, the three-dimensional model generating unit 43A processes the silhouette images by projecting the active depth information onto the dark area or whiteout area to be able to fill a hole in an area where the silhouette is corrupted or avoid generation of an unnecessary area due to noise. As a result, the three-dimensional model generating unit 43A can generate three-dimensional model information representing a more accurate three-dimensional model.

Figure 14:
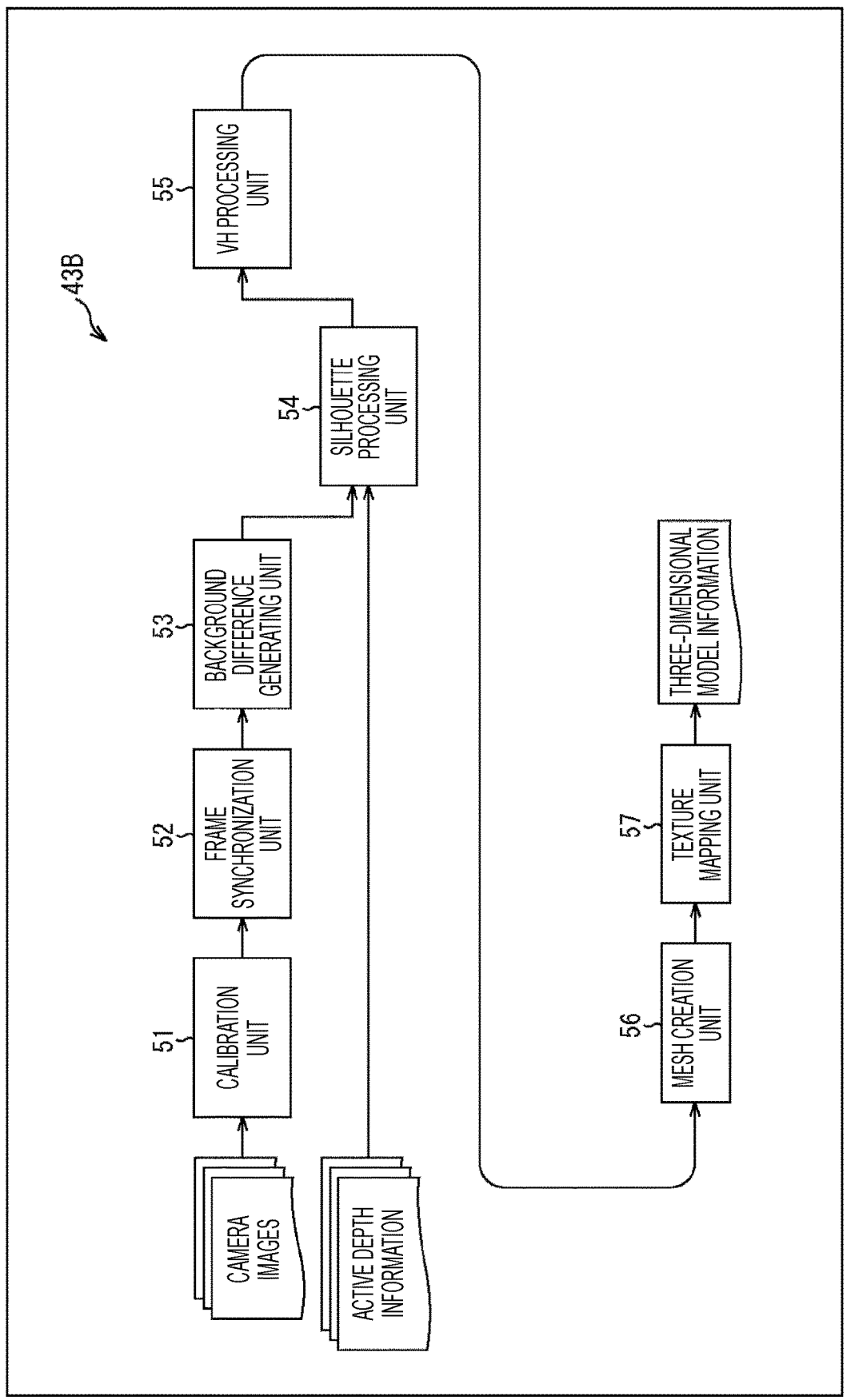
FIG. 14 is a diagram for explaining a second variation of a three-dimensional model generating unit.

FIG. 14 illustrates a three-dimensional model generating unit 43B being a second variation.

As illustrated in FIG. 14, the three-dimensional model generating unit 43B has a configuration common to that of the three-dimensional model generating unit 43 of FIG. 3 in terms of including the calibration unit 51, the frame synchronization unit 52, the background difference generating unit 53, the silhouette processing unit 54, the VH processing unit 55, the mesh creation unit 56, and the texture mapping unit 57.

That is, the three-dimensional model generating unit 43B includes the same blocks as the three-dimensional model generating unit 43 of FIG. 3, but has a configuration in which the silhouette processing unit 54 does not output silhouette processed area information. That is, the silhouette processed area information is a piece of auxiliary information and thus need not be included in the transmit data transmitted to the decoding system 13.

Also in the three-dimensional model generating unit 43B configured as described above, as with the three-dimensional model generating unit 43 of FIG. 3, the silhouette processing unit 54 can process the silhouette images by projecting the active depth information thereon at the time of generating the silhouette images. As a result, the three-dimensional model generating unit 43B can generate three-dimensional model information representing a more accurate three-dimensional model.

Figure 15:
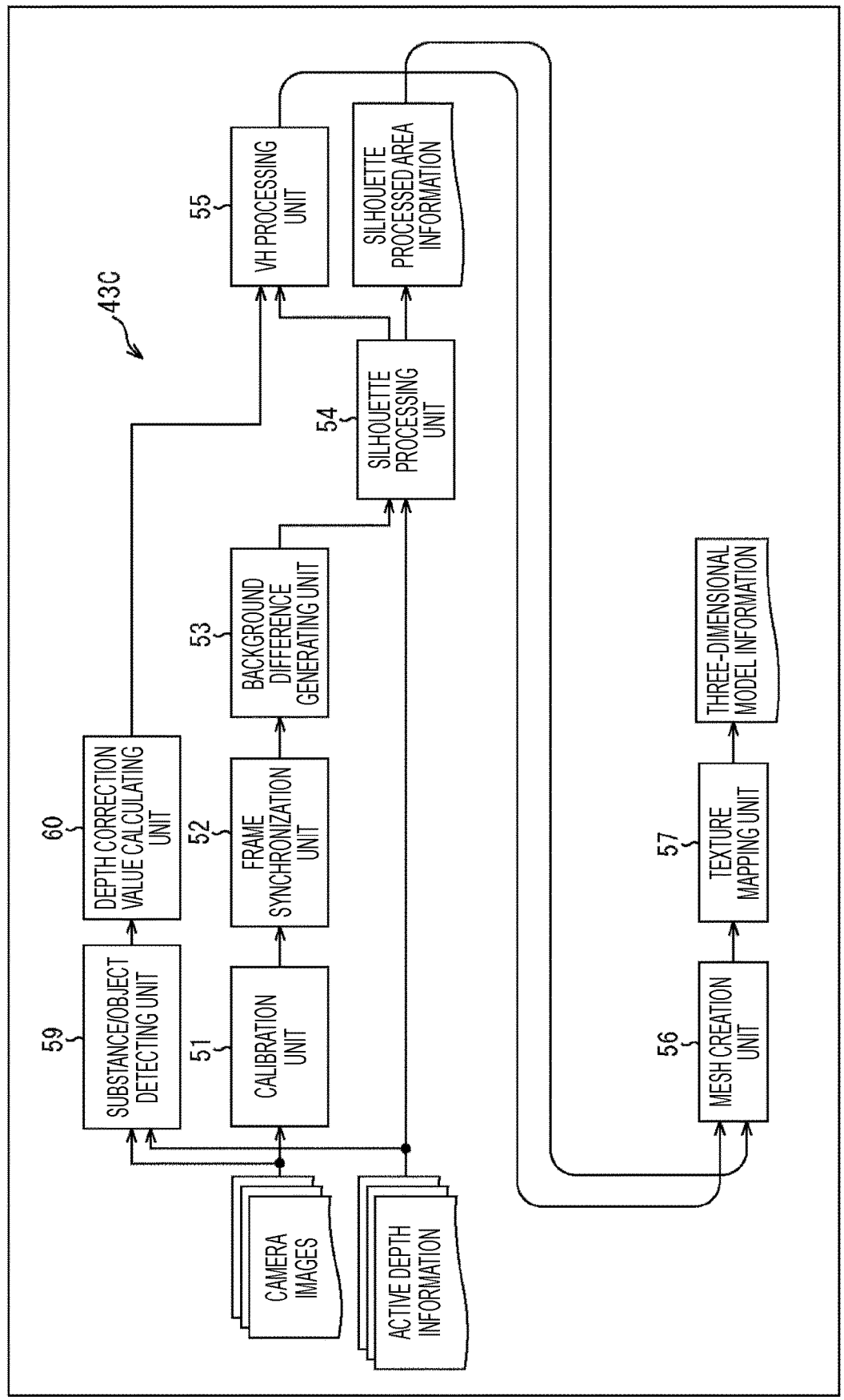
FIG. 15 is a diagram for explaining a third variation of a three-dimensional model generating unit.

FIG. 15 illustrates a three-dimensional model generating unit 43C being a third variation.

As illustrated in FIG. 15, the three-dimensional model generating unit 43C has a configuration common to that of the three-dimensional model generating unit 43 of FIG. 3 in terms of including the calibration unit 51, the frame synchronization unit 52, the background difference generating unit 53, the silhouette processing unit 54, the VH processing unit 55, the mesh creation unit 56, and the texture mapping unit 57. The three-dimensional model generating unit 43A further includes a substance/object detecting unit 59 and a depth correction value calculating unit 60.

The substance/object detecting unit 59 detects a substance or an object of the subject on the basis of the camera image obtained by the RGB camera 41 imaging the subject, and the active depth information obtained by the active sensor 42 finding the distance to the subject. Then, the substance/object detecting unit 59 supplies substance/object information indicating the substance or object of the subject to the depth correction value calculating unit 60.

For example, the substance/object detecting unit 59 can recognize the substance or object of the subject pixel by pixel in the camera image. Moreover, the substance/object detecting unit 59 can divide the camera image into segments for each subject shown in the camera image by performing segmentation processing on the camera image, and recognize the substance or object of the subject segment by segment. Note that the substance/object detecting unit 59 may estimate the substance from light reflectance and its reliability.

The segmentation processing may employ, for example, object recognition using so-called deep learning, or image-based processing such as super pixel segmentation using simple linear iterative clustering (SLIC) or the like or face recognition/skin color identification. Moreover, another sensor such as a temperature sensor may be added, and the output of the sensor may be used.

According to the substance/object information supplied from the substance/object detecting unit 59, the depth correction value calculating unit 60 calculates a depth correction amount for correcting the active depth information by the pixel of the camera image or by the segment obtained by dividing the camera image.

For example, in a case where the active depth information is acquired using infrared rays as with the active sensor 42, the accuracy of the active depth information varies depending on the characteristics of the substance or object (such as light reflection characteristics of a surface) of the subject. For example, it is difficult to accurately acquire the active depth information for hair, cutis, black objects, skin, and the like. Therefore, the depth correction value calculating unit 60 corrects the active depth information for each substance or object indicated by the substance/object information, so that a three-dimensional model without shape corruption can be generated.

As described above, the shape of the three-dimensional model can be improved by correcting the active depth information on the side of the encoding system 12. Then, the corrected active depth information may be transmitted to the side of the decoding system 13 together with the two-dimensional images and the depth information, for example.

Note that the depth correction value calculating unit 60 may generate a depth map from the corrected active depth information, or input the correction value to the VH processing unit 55 so that the VH processing unit 55 adjusts the extent of trimming with reference to the correction value in reconstructing the three-dimensional model.

Data formats of a correction amount table when different depth correction amounts are transmitted depending on the substance/object will be described with reference to FIGS. 16 to 21.

FIG. 16 illustrates an example of a first data format of the correction amount table for transmitting a correction amount pixel by pixel only for an area where a depth mask exists. As illustrated in FIG. 16, in the correction amount table, substance information, color information, a correction amount, reliability, and reliability along the time axis are registered in association with each other for every pixel position information.

Figure 17:
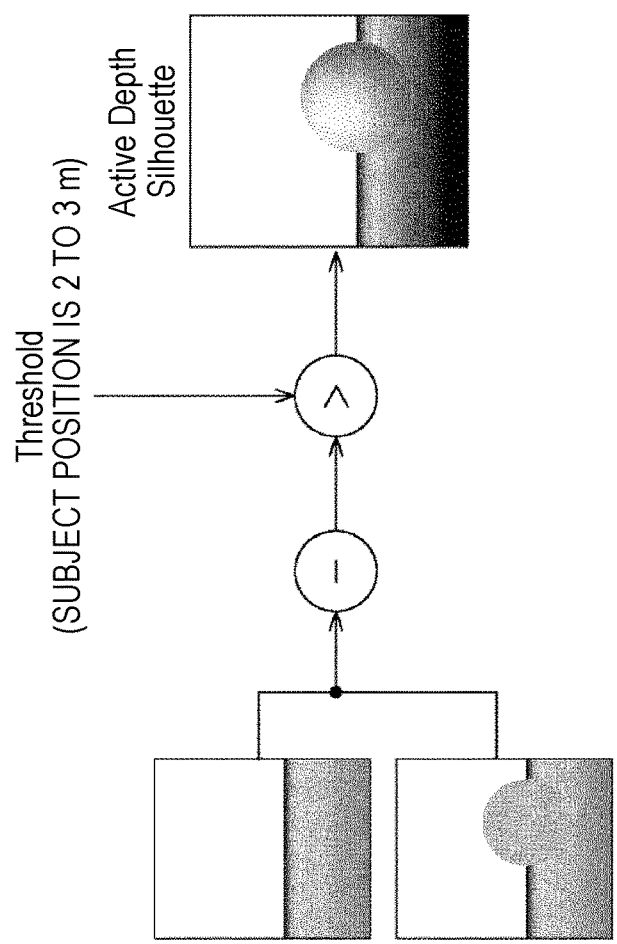
FIG. 17 is a diagram for explaining a silhouette image generated using a correction amount.

By using such a correction amount, as illustrated in FIG. 17, the active depth information can be corrected pixel by pixel so that a more accurate silhouette image can be generated.

FIG. 18 illustrates an example of a second data format of the correction amount table for transmitting a fixed correction amount segment by segment. As illustrated in FIG. 18, in the correction amount table, substance information, color information, a correction amount, reliability, and reliability along the time axis are registered in association with each other for every segment information.

Figure 19:
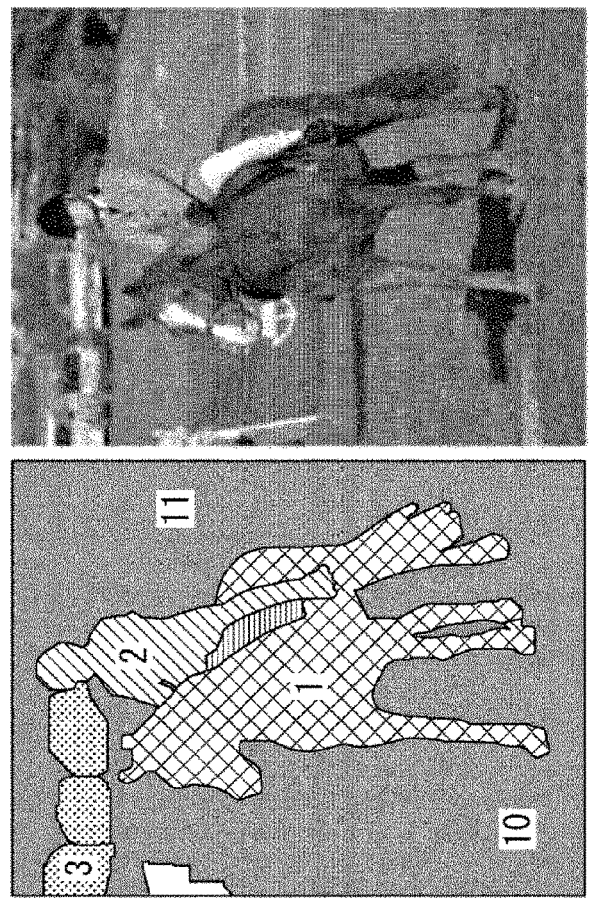
FIG. 19 is a diagram for explaining an example of segment information.

By using such a correction amount, as illustrated in FIG. 19, the active depth information can be corrected segment by segment so that a more accurate silhouette image can be generated.

FIG. 20 illustrates an example of a third data format of the correction amount table for transmitting a correction curve that corrects the active depth information. As illustrated in FIG. 20, in the correction amount table, substance information, color information, a correction curve, reliability, and reliability along the time axis are registered in association with each other for every pixel position information.

Figure 21:
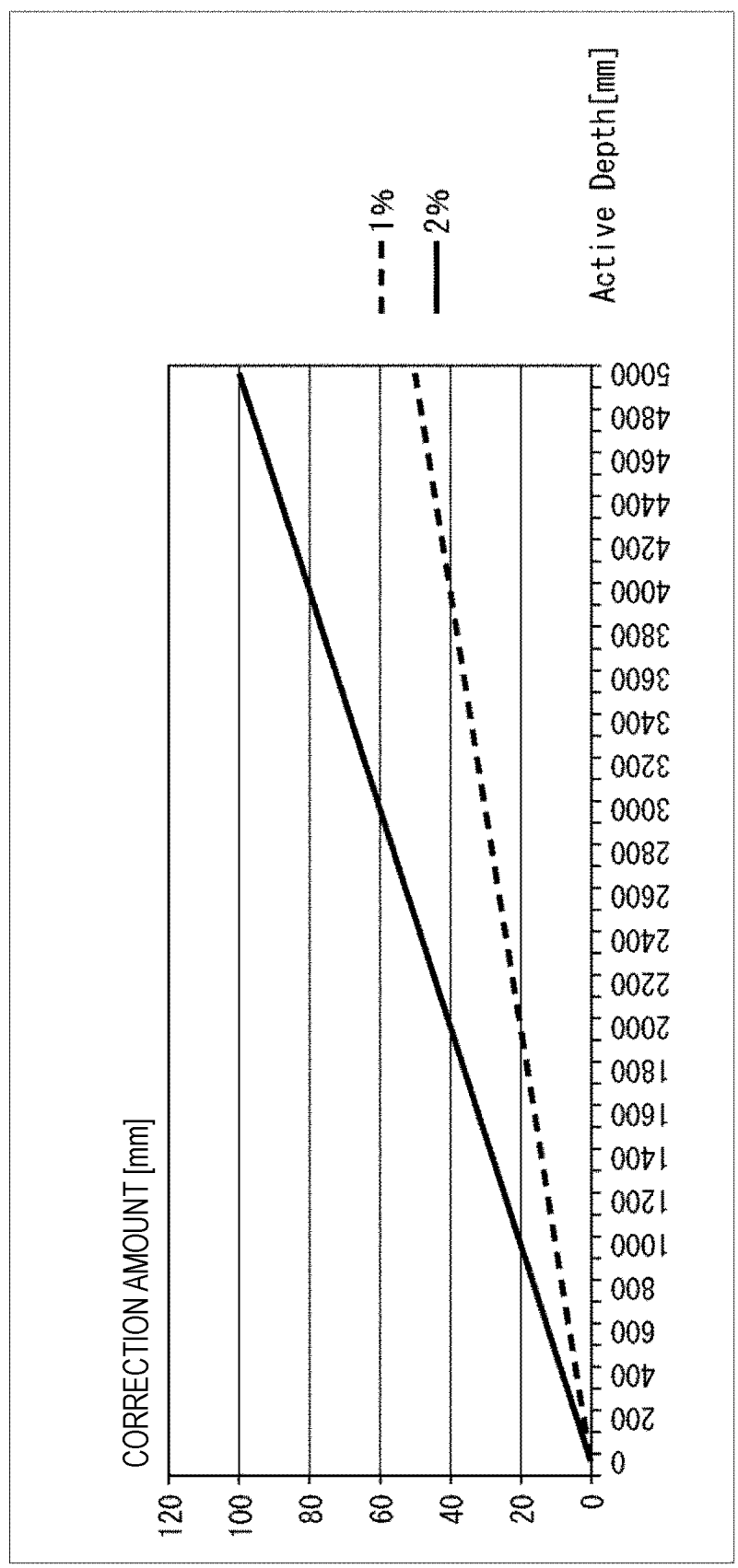
FIG. 21 is a diagram for explaining a correction amount curve.

That is, as illustrated in FIG. 21, it has been determined from an experiment that an error of about 1% occurs in the active depth information depending on the distance, and a correction curve for performing correction (such as 1% or 2% correction) is transmitted depending on the characteristics of the active sensor 42 used. For example, when the active sensor 42 has the characteristics of over estimation, a correction curve for performing correction that results in a value 2% behind the detected depth distance is transmitted. Moreover, the correction curve being transmitted is one whose amplitude (correction amount) is adjusted depending on the substance.

Then, the correction values and the reliability are transmitted in the data formats as illustrated in FIGS. 16, 18, and 19, and the three-dimensional data conversion processing unit 33 performs the processing of reconstructing the three-dimensional model with reference to the active depth information corrected on the basis of the correction values and the reliability.

<Variations of Transmit Data>

Variations of the transmit data will be described with reference to FIGS. 22 to 27.

Figure 22:
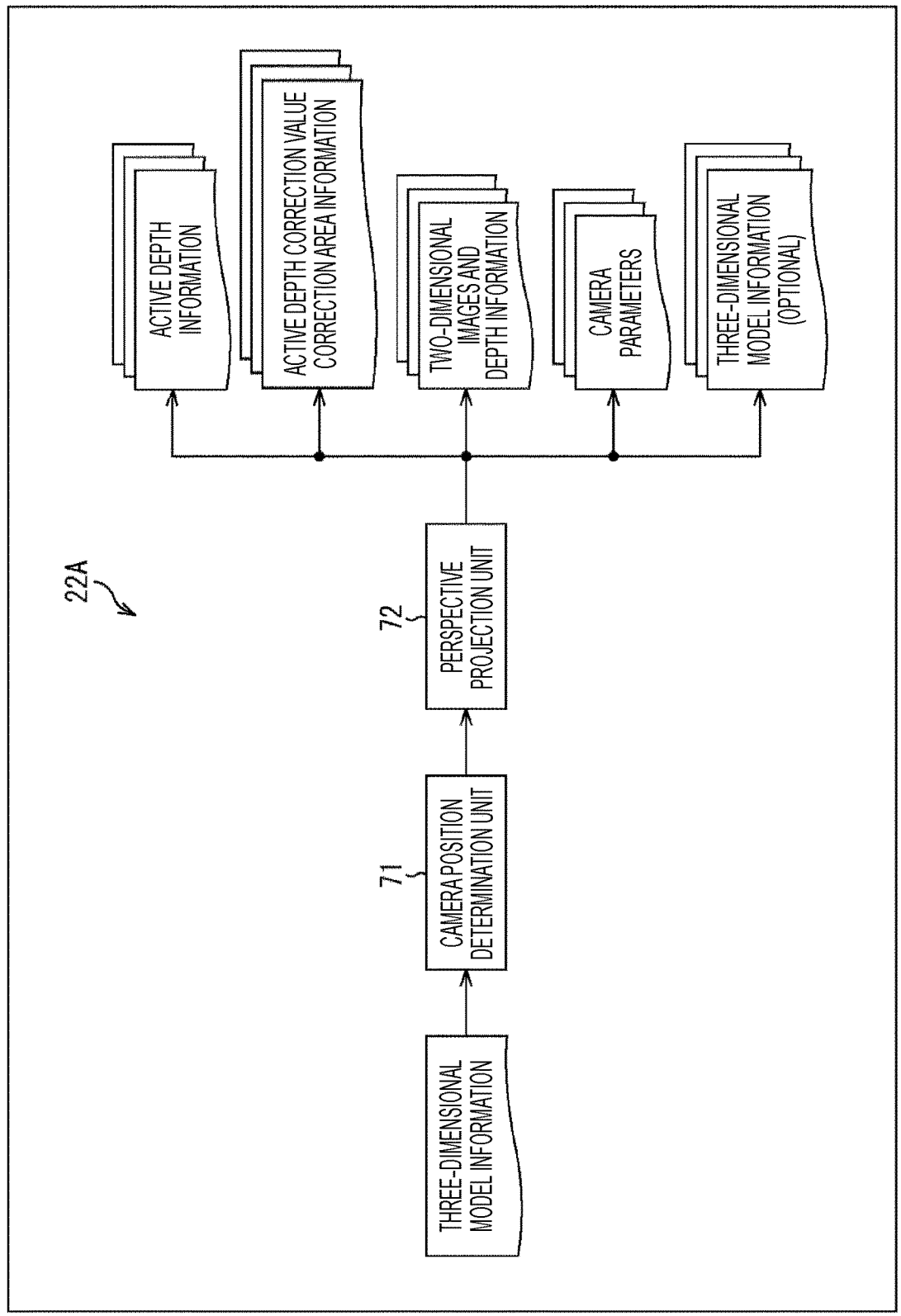
FIG. 22 is a diagram illustrating a transmission side of transmit data according to a first variation.
Figure 23:
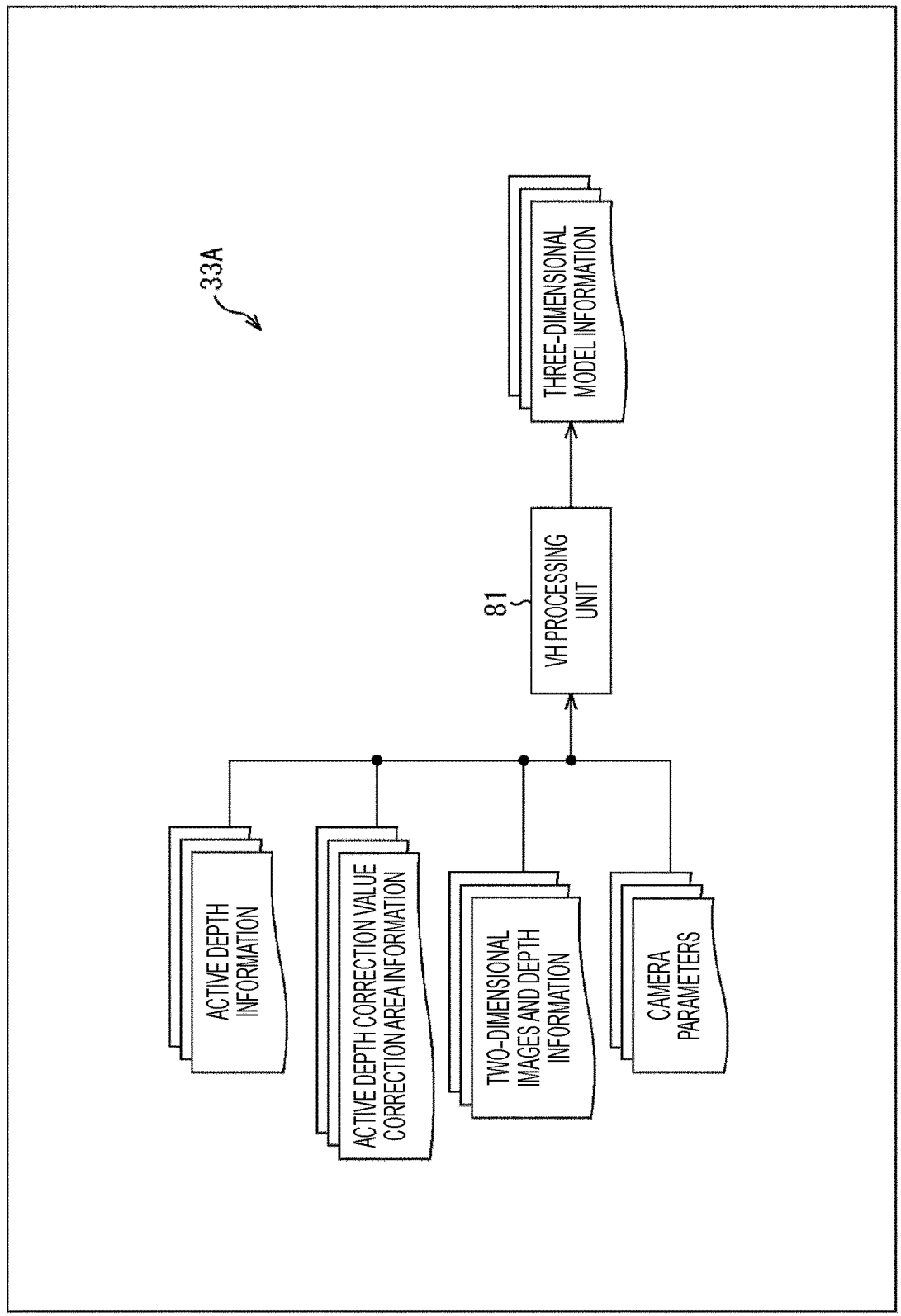
FIG. 23 is a diagram illustrating a receiving side of the transmit data according to the first variation.

FIG. 22 illustrates a block diagram illustrating an example of a configuration of a two-dimensional image conversion processing unit 22A that is on the transmission side of the transmit data according to a first variation, and FIG. 23 illustrates a block diagram illustrating an example of a configuration of a three-dimensional data conversion processing unit 33A that is on the receiving side of the transmit data according to the first variation.

For example, as described above with reference to FIG. 15, the three-dimensional model generating unit 43C including the substance/object detecting unit 59 and the depth correction value calculating unit 60 is used, and the transmit data of the first variation is transmitted in a case where the active depth information cannot be corrected properly. As illustrated in FIG. 22, the transmit data of the first variation includes an active depth correction value and correction area information (that is, the correction amount table described above).

Then in the three-dimensional data conversion processing unit 33A, as illustrated in FIG. 23, the VH processing unit 81 performs conversion processing of converting two-dimensional images into a three-dimensional model with reference to the active depth information.

For example, it is assumed that the transmit data including the active depth correction value and the correction area information is used in a case where the active depth information cannot be corrected completely on the transmission side even if corrected with the substance/object detecting unit 59 of FIG. 15 performing the object/substance detection. For example, on the receiving side, the active depth correction value and the correction area information can be used as the reliability. The VH processing unit 81 can thus select means for trimming the three-dimensional model while adaptively switching the active depth information and the depth information (stereo depth) for each area depending on the reliability.

Figure 24:
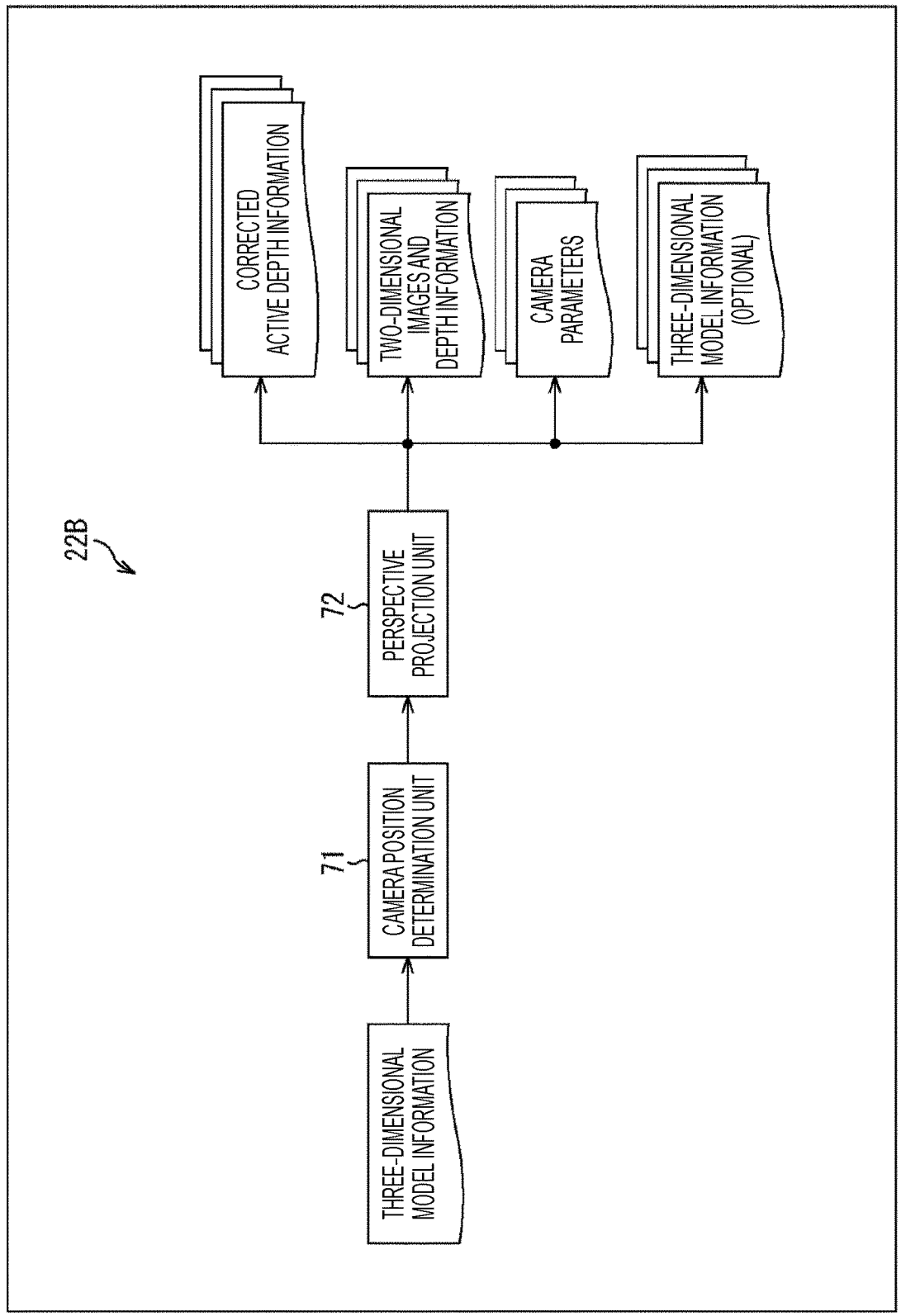
FIG. 24 is a diagram illustrating a transmission side of transmit data according to a second variation.
Figure 25:
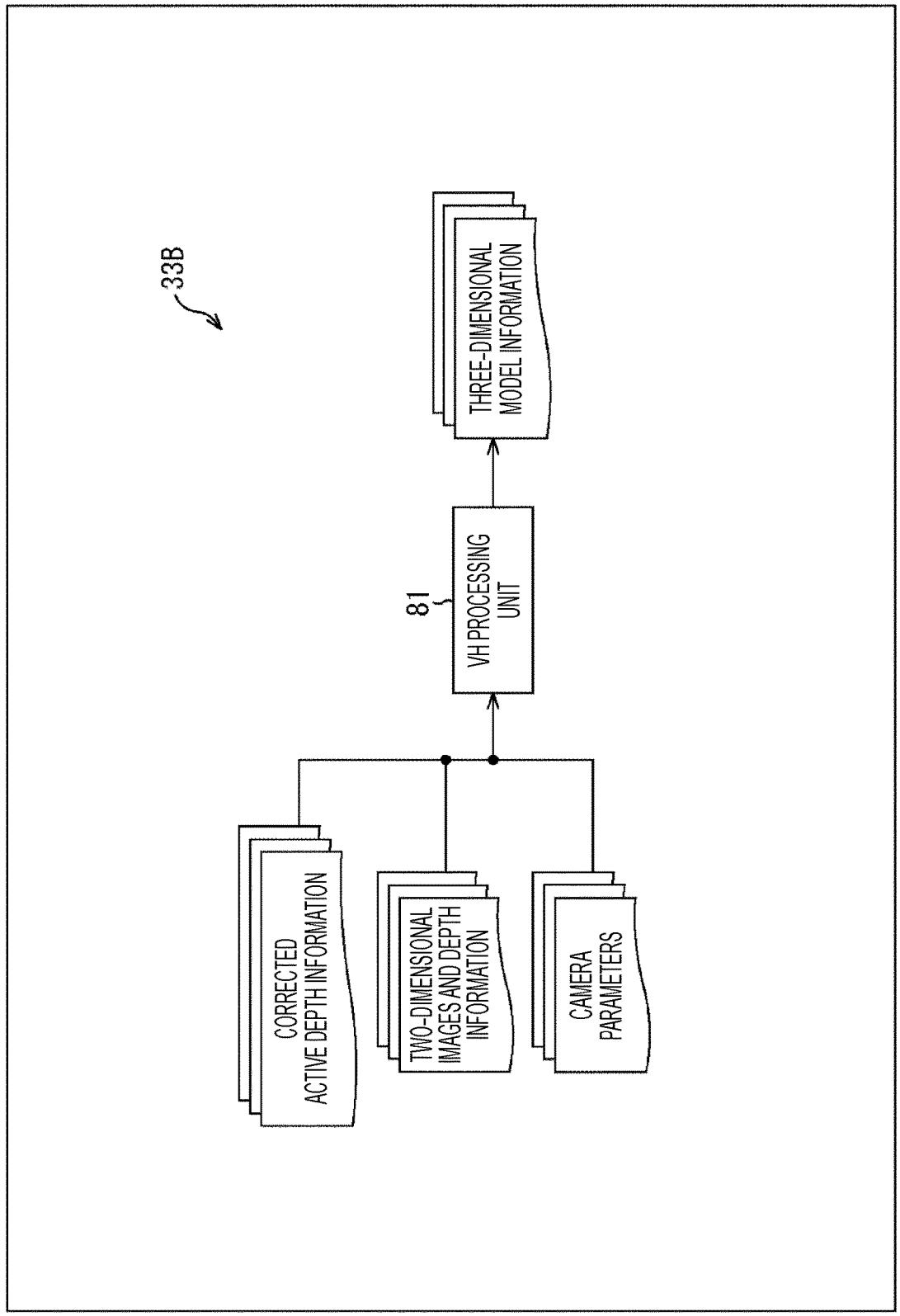
FIG. 25 is a diagram illustrating a receiving side of the transmit data according to the second variation.

FIG. 24 illustrates a block diagram of a two-dimensional image conversion processing unit 22B that is on the transmission side of the transmit data according to a second variation, and FIG. 25 illustrates a block diagram of a three-dimensional data conversion processing unit 33B that is on the receiving side of the transmit data according to the second variation.

For example, as described above with reference to FIG. 15, the three-dimensional model generating unit 43C including the substance/object detecting unit 59 and the depth correction value calculating unit 60 is used, and the transmit data of the second variation is transmitted in a case where the active depth information can be corrected properly. As illustrated in FIG. 24, the transmit data of the first variation includes corrected active depth information.

Then in the three-dimensional data conversion processing unit 33B, as illustrated in FIG. 25, the VH processing unit 81 performs conversion processing of converting two-dimensional images into a three-dimensional model with reference to the corrected active depth information.

Figure 26:
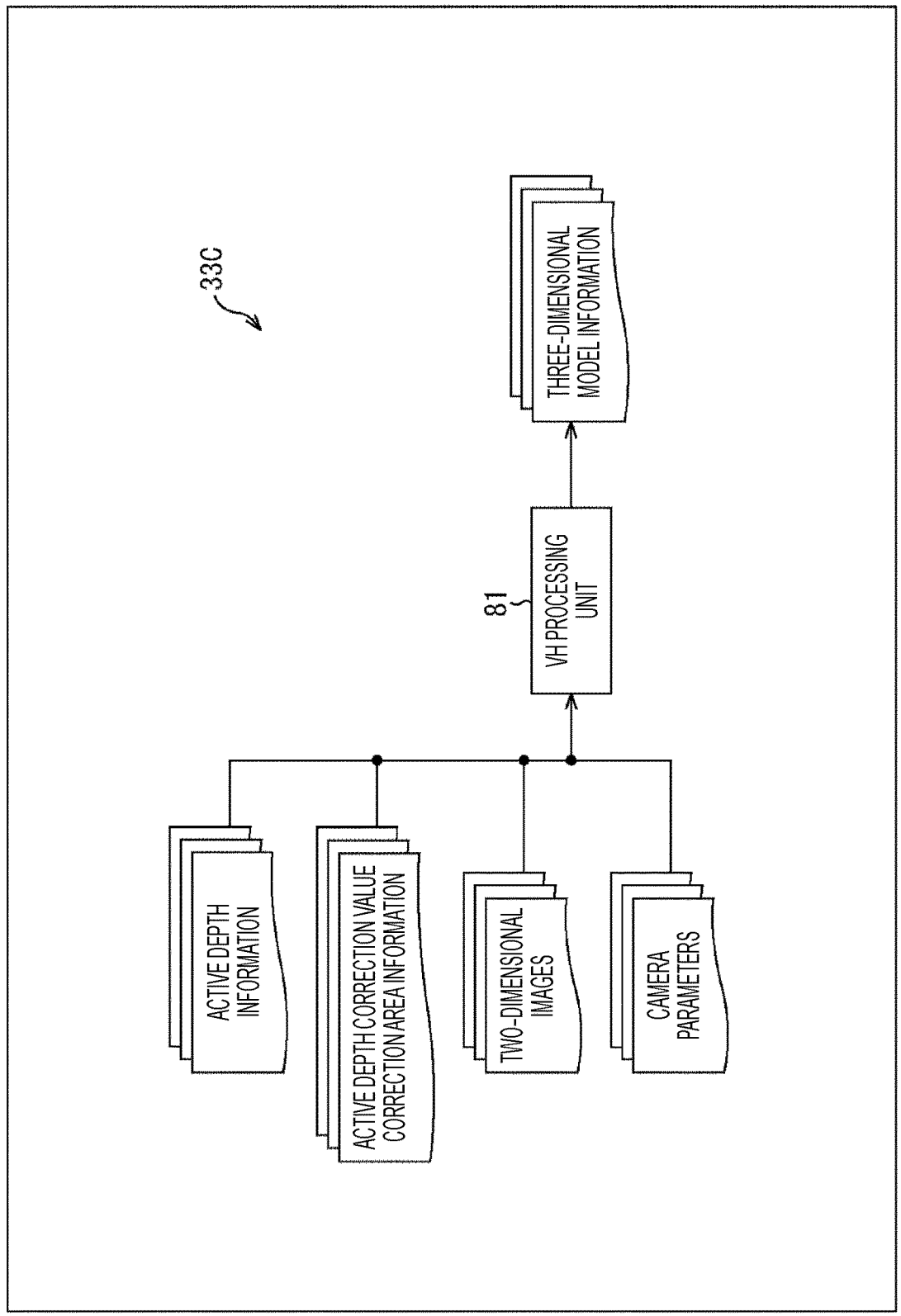
FIG. 26 is a diagram illustrating a receiving side of transmit data according to a third variation.
Figure 27:
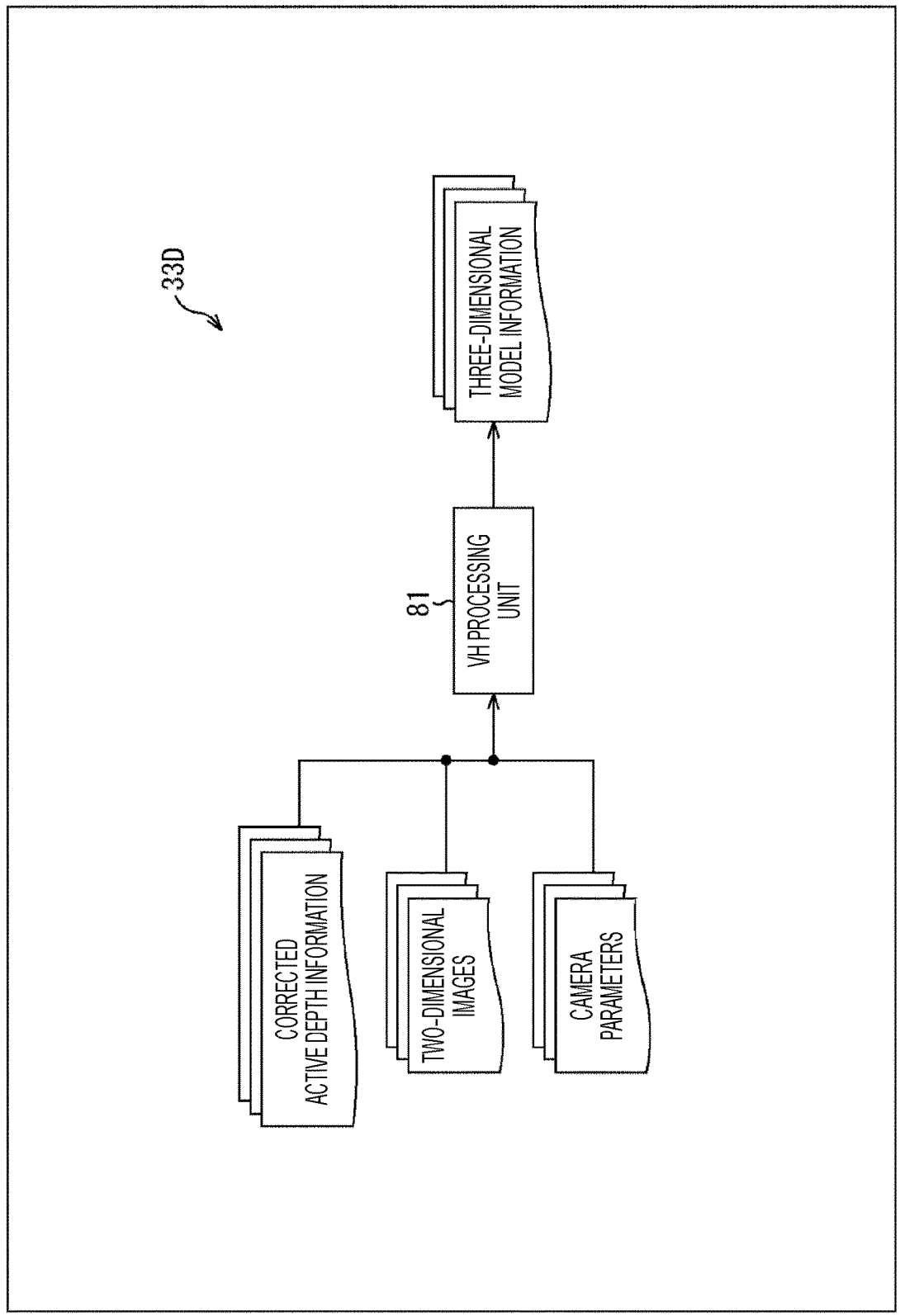
FIG. 27 is a diagram illustrating a receiving side of transmit data according to a fourth variation.

FIG. 26 illustrates a block diagram of a two-dimensional image conversion processing unit 33C that is on the receiving side of the transmit data according to a third variation, and FIG. 27 illustrates a block diagram of a three-dimensional data conversion processing unit 33D that is on the receiving side of the transmit data according to a fourth variation.

As illustrated in FIG. 26, the transmit data of the third variation includes the active depth information, the active depth correction value and correction area information, the two-dimensional images, and the camera parameters. Moreover, as illustrated in FIG. 27, the transmit data of the third variation includes the corrected active depth information, the two-dimensional images, and the camera parameters.

That is, the depth information is not transmitted in the transmit data of the third and fourth variations, so that the transmit data can be compressed. The depth information has the same image size as the two-dimensional image and has a high bit depth, for example. Thus, in an environment where the depth information cannot be transmitted, the cost of transmission can be reduced by transmitting only the active depth information whose data size is smaller than that of the depth information (that is, approximately one-tenth the size of the depth information). Note that in this case, the modeling needs to be performed on the receiving side.

<Method of Preventing Appearance of Shadow in Silhouette Image>

Figure 28:
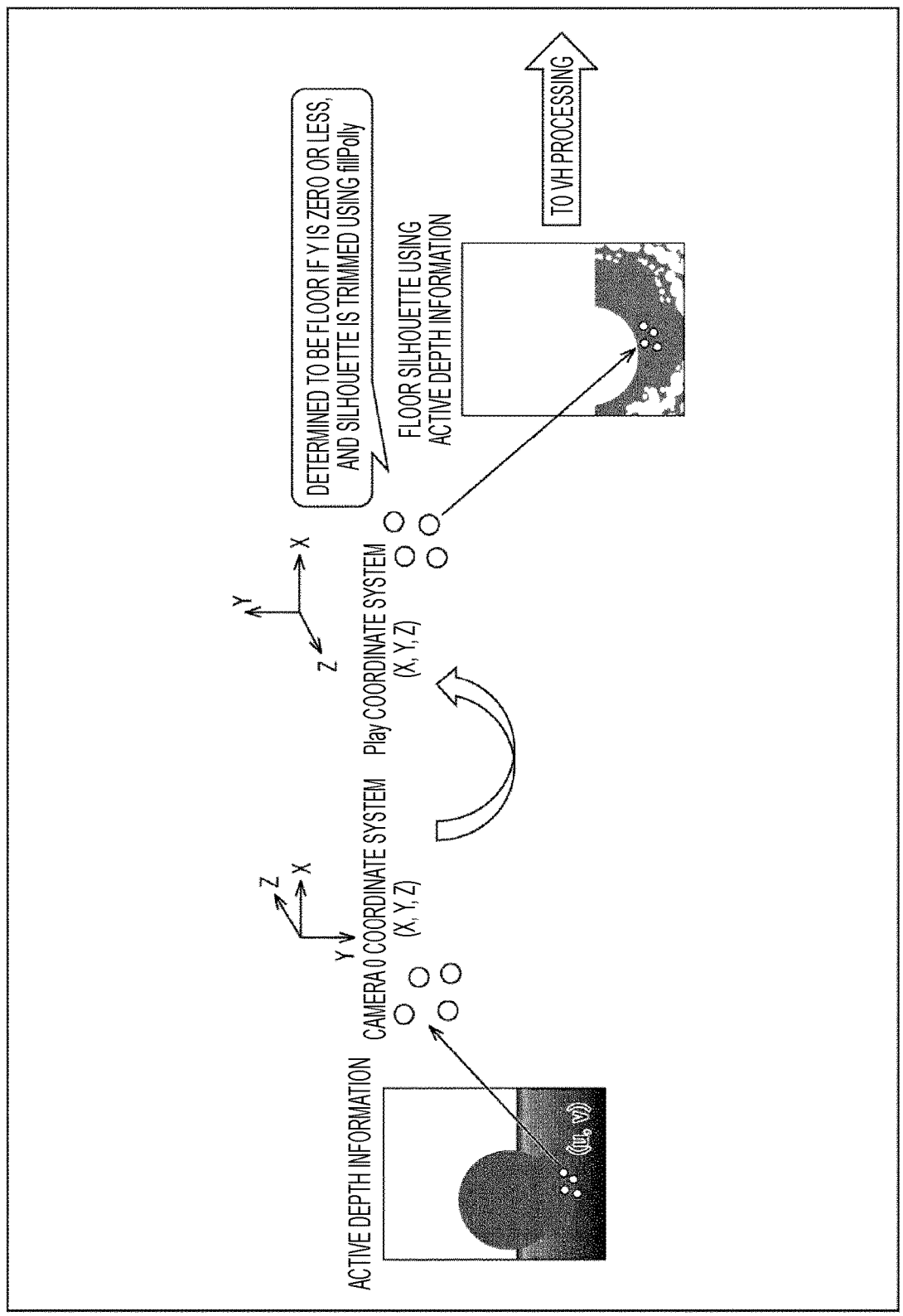
FIG. 28 is a diagram for explaining a method of preventing appearance of a shadow of a subject on a silhouette image.

A method of preventing the appearance of a shadow in the silhouette image will be described with reference to FIG. 28.

A conventional art has used only the camera images (color images) when generating a visual hull, for example, whereas the VH processing unit 55 can generate a visual hull using the silhouette image of the active depth information. Note that the silhouette image of the active depth information is unstable and thus generated as a silhouette image in which only a floor is detected.

Then, the VH processing unit 55 trims off an area of black (off, 0) while leaving an area of white (on, 1) in the silhouette. Therefore, in the example of a mask illustrated in FIG. 28, the floor being the black portion is trimmed so that a shadow can be removed.

<Example of Configuration of Computer>

Note that each processing described with reference to the aforementioned flowchart need not necessarily be performed chronologically in the order listed in the flowchart but includes processing executed concurrently or separately (for example, parallel processing or processing by an object). Moreover, a program may be processed by a single CPU or processed in a distributed manner by a plurality of CPUs or graphics processing units (GPUs).

Furthermore, the series of processings described above (the encoding method and the decoding method) can be executed by hardware or software. In a case where the series of processings is executed by software, a program included in the software is installed on a computer that is incorporated in dedicated hardware, for example, a general-purpose personal computer or the like that can execute various functions by installing various programs, or the like from a program recording medium in which the program is recorded.

FIG. 29 is a block diagram illustrating an example of a configuration of hardware of a computer that executes the series of processings described above according to a program.

In a computer, a central processing unit (CPU) 101, a read only memory (ROM) 102, and a random access memory (RAM) 103 are mutually connected via a bus 104.

An input/output interface 105 is also connected to the bus 104. The input/output interface 105 is connected to an input unit 106 including a keyboard, a mouse, a microphone, or the like, an output unit 107 including a display, a speaker, or the like, a storage unit 108 including a hard disk, a non-volatile memory, or the like, a communication unit 109 including a network interface or the like, and a drive 110 for driving a removable medium 111 such as a magnetic disk, an optical disc, a magneto-optical disk, or a semiconductor memory.

In the computer configured as described above, the series of processings described above is performed by, for example, the CPU 101 loading the program stored in the storage unit 108 to the RAM 103 via the input/output interface 105 and the bus 104 and executing the program.

The program executed by the computer (CPU 101) is, for example, provided while being recorded in the removable medium 111 that is a package medium or via a wired or wireless transmission medium such as a local area network, the Internet, or digital satellite broadcasting, the package medium including a magnetic disk (including a flexible disk), an optical disc (such as a compact disc-read only memory (CD-ROM) or a digital versatile disc (DVD)), a magneto-optical disk, a semiconductor memory, or the like.

The program can then be installed in the storage unit 108 via the input/output interface 105 by placing the removable medium 111 in the drive 110. Also, the program can be received by the communication unit 109 via the wired or wireless transmission medium and installed in the storage unit 108. In addition, the program can be installed in advance in the ROM 102 or the storage unit 108.

<Examples of Combination of Configurations>

Note that the present technology can also be embodied in the following configurations.

(1)

An encoding device including:

a three-dimensional model generating unit that generates three-dimensional model information representing a three-dimensional model of a subject on the basis of a plurality of captured images obtained by imaging the subject from a plurality of viewpoints, and active depth information indicating a distance to the subject from a viewpoint different from viewpoints of the plurality of captured images;

a conversion processing unit that converts the three-dimensional model represented by the three-dimensional model information into a plurality of two-dimensional images by projecting the three-dimensional model from a plurality of directions, and generates depth information representing a depth from an arbitrary viewpoint to the three-dimensional model by using the plurality of two-dimensional images; and a transmission unit that transmits transmit data including the plurality of two-dimensional images and the depth information to a decoding device.

(2)

The encoding device according to (1), in which the transmission unit transmits the transmit data further including the active depth information.

(3)

The encoding device according to (1) or (2), in which
the three-dimensional model generating unit includes:
a background difference generating unit that determines a background difference from the plurality of captured images and generates silhouette images each representing, in binary form, a silhouette indicating a range in which the subject is shown in each of the captured images; and
a silhouette processing unit that projects the active depth information onto the plurality of silhouette images and performs processing on a corruption occurring in the silhouette of the subject on the silhouette images.

(4)

The encoding device according to (3), in which
the silhouette processing unit outputs processed area information indicating an area in which the silhouette of the subject on the silhouette images is subjected to processing, and
the transmission unit transmits the transmit data further including the processed area information.

(5)

The encoding device according to (3) or (4), in which
the silhouette processing unit performs processing that fills a hole appearing in the silhouette of the subject on the silhouette images.

(6)

The encoding device according to (3) or (4), in which
the silhouette processing unit performs processing that removes a shadow of the subject appearing as the silhouette in the silhouette images.

(7)

The encoding device according to any one of (1) to (6), further including
a dark/whiteout area detecting unit that detects a dark area having a predetermined brightness value or lower and a whiteout area having a predetermined brightness value or higher in the plurality of captured images, in which
the silhouette processing unit performs processing on the silhouette of the subject in the dark area or the whiteout area on the silhouette images.

(8)

The encoding device according to any one of (1) to (6), further including:
an object/substance detecting unit that detects an object or substance of the subject on the basis of the plurality of captured images and the active depth information; and
a correction value calculating unit that calculates a correction value used to correct the active depth information depending on the object or substance of the subject, in which
the active depth information corrected on the basis of the correction value is used to generate the three-dimensional model information representing the three-dimensional model of the subject.

(9)

The encoding device according to (8), in which
the transmission unit transmits the transmit data further including the correction value and reliability of the correction value.

(10)

The encoding device according to (8) or (9), in which
the object/substance detecting unit divides the captured image into segments each corresponding to a subject in the captured image, and detects an object or substance of the subject segment by segment.

(11)

An encoding method including:
generating three-dimensional model information representing a three-dimensional model of a subject on the basis of a plurality of captured images obtained by imaging the subject from a plurality of viewpoints, and active depth information indicating a distance to the subject from a viewpoint different from viewpoints of the plurality of captured images;
converting the three-dimensional model represented by the three-dimensional model information into a plurality of two-dimensional images by projecting the three-dimensional model from a plurality of directions, and generating depth information representing a depth from an arbitrary viewpoint to the three-dimensional model by using the plurality of two-dimensional images; and
transmitting transmit data including the plurality of two-dimensional images and the depth information to a decoding device.

(12)

A decoding device including:
a reception unit that receives transmit data including a plurality of two-dimensional images and depth information, the transmit data being transmitted after three-dimensional model information representing a three-dimensional model of a subject is generated on the basis of a plurality of captured images obtained by imaging the subject from a plurality of viewpoints and active depth information indicating a distance to the subject from a viewpoint different from viewpoints of the plurality of captured images, the three-dimensional model represented by the three-dimensional model information is converted into the plurality of two-dimensional images by projecting the three-dimensional model from a plurality of directions, and the depth information representing a depth from an arbitrary viewpoint to the three-dimensional model is generated by using the plurality of two-dimensional images; and
a three-dimensional data conversion processing unit that converts the plurality of two-dimensional images and the depth information into the three-dimensional model information representing the three-dimensional model of the subject.

(13)

The decoding device according to (12), in which
the reception unit receives the transmit data including the plurality of two-dimensional images, the depth information, and the active depth information, and
the three-dimensional data conversion processing unit converts the plurality of two-dimensional images and the depth information into the three-dimensional model information representing the three-dimensional model of the subject with reference to the active depth information.

(14)

The decoding device according to (12) or (13), in which
the reception unit receives the transmit data further including processed area information that indicates an area in which a corruption occurring in a silhouette of the subject on a plurality of silhouette images is subjected to processing, the processed area information being generated after a background difference is determined from the plurality of captured images, the silhouette images each representing, in binary form, the silhouette indicating a range in which the subject is shown in each of the captured images are generated, the active depth information is projected onto the silhouette images, and the corruption occurring in the silhouette of the subject on the silhouette images is subjected to the processing, and the three-dimensional data conversion processing unit projects the active depth information onto the area indicated by the processed area information.

(15)

The decoding device according to any one of (12) to (14), in which an object or substance of the subject is detected on the basis of the plurality of captured images and the active depth information, then the reception unit receives the transmit data including a correction value used to correct the active depth information depending on the object or substance of the subject and reliability of the correction value, and the three-dimensional data conversion processing unit refers to the active depth information corrected on the basis of the correction value and the reliability.

(16)

A decoding method including:

receiving transmit data including a plurality of two-dimensional images and depth information, the transmit data being transmitted after three-dimensional model information representing a three-dimensional model of a subject is generated on the basis of a plurality of captured images obtained by imaging the subject from a plurality of viewpoints and active depth information indicating a distance to the subject from a viewpoint different from viewpoints of the plurality of captured images, the three-dimensional model represented by the three-dimensional model information is converted into the plurality of two-dimensional images by projecting the three-dimensional model from a plurality of directions, and the depth information representing a depth from an arbitrary viewpoint to the three-dimensional model is generated by using the plurality of two-dimensional images; and converting the plurality of two-dimensional images and the depth information into the three-dimensional model information representing the three-dimensional model of the subject.

Note that the present embodiment is not limited to the aforementioned embodiment, where various modifications can be made without departing from the scope of the present disclosure. Furthermore, the effect described in the present specification is provided by way of example and not by way of limitation, where there may be another effect.

REFERENCE SIGNS LIST

11 Free viewpoint video transmission system
12 Encoding system
13 Decoding system
21 Three-dimensional data acquisition unit
22 Two-dimensional image conversion processing unit
23 Encoding unit
24 Transmission unit
31 Reception unit
32 Decoding unit
33 Three-dimensional data conversion processing unit
34 Three-dimensional data display unit
41 RGB camera
42 Active sensor
43 Three-dimensional model generating unit
44 Image acquisition unit
51 Calibration unit
52 Frame synchronization unit
53 Background difference generating unit
54 Silhouette processing unit
55 VH processing unit
56 Mesh creation unit
57 Texture mapping unit
58 Dark/whiteout area detecting unit
59 Substance/object detecting unit
60 Depth correction value calculating unit
71 Camera position determination unit
72 Perspective projection unit
81 VH processing unit

The invention claimed is:

1. An encoding device comprising:
a three-dimensional model generating unit configured to generate three-dimensional model information representing a three-dimensional model of a subject on a basis of a plurality of captured images obtained by imaging the subject from a plurality of viewpoints, and active depth information indicating a distance to the subject from a plurality of viewpoints different from the plurality of viewpoints from which the plurality of captured images are imaged;
a conversion processing unit configured to
convert the three-dimensional model represented by the three-dimensional model information into a plurality of two-dimensional images by projecting the three-dimensional model from a plurality of directions, and
generate depth information representing a depth from an arbitrary viewpoint to the three-dimensional model by using the plurality of two-dimensional images; and
a transmission unit configured to transmit transmit data including the plurality of two-dimensional images and the depth information to a decoding device,
wherein the three-dimensional model generating unit, the conversion processing unit, and the transmission unit are each implemented via at least one processor.

2. The encoding device according to claim 1, wherein the transmission unit transmits the transmit data further including the active depth information.

3. The encoding device according to claim 1, wherein the three-dimensional model generating unit includes:
a background difference generating unit configured to
determine a background difference from the plurality of captured images, and
generate a plurality of silhouette images each representing, in binary form, a silhouette indicating a range in which the subject is shown in each of the captured images; and
a silhouette processing unit configured to
project the active depth information onto the plurality of silhouette images, and
perform processing on a corruption occurring in the silhouette of the subject on the silhouette images.

4. The encoding device according to claim 3, wherein the silhouette processing unit is further configured to output processed area information indicating an area in which the silhouette of the subject on the silhouette images is subjected to processing, and
the transmission unit transmits the transmit data further including the processed area information.

5. The encoding device according to claim 3, wherein the silhouette processing unit performs processing that fills a hole appearing in the silhouette of the subject on the silhouette images.

6. The encoding device according to claim 3, wherein the silhouette processing unit performs processing that removes a shadow of the subject appearing as the silhouette in the silhouette images.

7. The encoding device according to claim 3, further comprising:
- a dark/whiteout area detecting unit configured to detect a dark area having a predetermined brightness value or lower and a whiteout area having a predetermined brightness value or higher in the plurality of captured images,
- wherein the silhouette processing unit performs processing on the silhouette of the subject in the dark area or the whiteout area on the silhouette images, and
- wherein the dark/whiteout area detecting unit is implemented via at least one processor.

8. The encoding device according to claim 1, further comprising:
- an object/substance detecting unit configured to detect an object or substance of the subject on a basis of the plurality of captured images and the active depth information; and
- a correction value calculating unit configured to calculate a correction value used to correct the active depth information depending on the object or substance of the subject,
- wherein the active depth information corrected on a basis of the correction value is used to generate the three-dimensional model information representing the three-dimensional model of the subject, and
- wherein the object/substance detecting unit and the correction value detecting unit are each implemented via at least one processor.

9. The encoding device according to claim 8, wherein the transmission unit transmits the transmit data further including the correction value and reliability of the correction value.

10. The encoding device according to claim 8, wherein the object/substance detecting unit is further configured to
- divide the captured image into segments each corresponding to a subject in the captured image, and
- detect an object or substance of the subject segment by segment.

11. An encoding method comprising:
- generating three-dimensional model information representing a three-dimensional model of a subject on a basis of a plurality of captured images obtained by imaging the subject from a plurality of viewpoints, and active depth information indicating a distance to the subject from a plurality of viewpoints different from the plurality of viewpoints from which the plurality of captured images are imaged;
- converting the three-dimensional model represented by the three-dimensional model information into a plurality of two-dimensional images by projecting the three-dimensional model from a plurality of directions;
- generating depth information representing a depth from an arbitrary viewpoint to the three-dimensional model by using the plurality of two-dimensional images; and
- transmitting transmit data including the plurality of two-dimensional images and the depth information to a decoding device,
- wherein the active depth information is generated based on a detected substance of the subject.

12. A decoding device comprising:
- a reception unit configured to receive transmit data including a plurality of two-dimensional images and depth information, the transmit data being transmitted after three-dimensional model information representing a three-dimensional model of a subject is generated on a basis of a plurality of captured images obtained by imaging the subject from a plurality of viewpoints and active depth information indicating a distance to the subject from a plurality of viewpoints different from the plurality of viewpoints from which the plurality of captured images are imaged, the three-dimensional model represented by the three-dimensional model information is converted into the plurality of two-dimensional images by projecting the three-dimensional model from a plurality of directions, and the depth information representing a depth from an arbitrary viewpoint to the three-dimensional model is generated by using the plurality of two-dimensional images; and
- a three-dimensional data conversion processing unit configured to convert the plurality of two-dimensional images and the depth information into the three-dimensional model information representing the three-dimensional model of the subject,
- wherein the active depth information is generated based on a detected substance of the subject, and
- wherein the reception unit and the three-dimensional data conversion unit are each implemented via at least one processor.

13. The decoding device according to claim 12, wherein
- the reception unit receives the transmit data including the plurality of two-dimensional images, the depth information, and the active depth information, and
- the three-dimensional data conversion processing unit converts the plurality of two-dimensional images and the depth information into the three-dimensional model information representing the three-dimensional model of the subject with reference to the active depth information.

14. The decoding device according to claim 12, wherein
- the reception unit receives the transmit data further including processed area information that indicates an area in which a corruption occurring in a silhouette of the subject on a plurality of silhouette images is subjected to processing, the processed area information being generated after a background difference is determined from the plurality of captured images, the silhouette images each representing, in binary form, the silhouette indicating a range in which the subject is shown in each of the captured images are generated, the active depth information is projected onto the silhouette images, and the corruption occurring in the silhouette of the subject on the silhouette images is subjected to the processing, and
- the three-dimensional data conversion processing unit projects the active depth information onto the area indicated by the processed area information.

15. The decoding device according to claim 12, wherein
- the substance of the subject is detected on a basis of the plurality of captured images and the active depth information, then the reception unit receives the transmit data including a correction value used to correct the active depth information depending on the detected substance of the subject and reliability of the correction value, and
- the three-dimensional data conversion processing unit refers to the active depth information corrected on a basis of the correction value and the reliability.

16. A decoding method comprising:
- receiving transmit data including a plurality of two-dimensional images and depth information, the transmit data being transmitted after three-dimensional model information representing a three-dimensional model of a subject is generated on a basis of a plurality of captured images obtained by imaging the subject from a plurality of viewpoints and active depth information indicating a distance to the subject from a plurality of viewpoints different from the plurality of viewpoints from which the plurality of captured images are imaged, the three-dimensional model represented by the three-dimensional model information is converted into the plurality of two-dimensional images by projecting the three-dimensional model from a plurality of directions, and the depth information representing a depth from an arbitrary viewpoint to the three-dimensional model is generated by using the plurality of two-dimensional images; and converting the plurality of two-dimensional images and the depth information into the three-dimensional model information representing the three-dimensional model of the subject, wherein the active depth information is generated based on a detected substance of the subject.

17. The decoding device according to claim 11, wherein the substance of the subject is detected on a basis of the plurality of captured images and the active depth information, then a correction value is generated to correct the active depth information depending on the detected substance of the subject and reliability of the correction value, and the correction value and the reliability are transmitted with the transmit data.

* * * * *